US011182259B2

(12) United States Patent
Haque et al.

(10) Patent No.: US 11,182,259 B2
(45) Date of Patent: Nov. 23, 2021

(54) CONFIGURATION ROLLBACK BASED ON THE FAILURE TO SATISFY PREDEFINED CONDITIONS

(71) Applicant: Pismo Labs Technology Limited, Kowloon (HK)

(72) Inventors: Mohammad Ashiq-ul Haque, Dacca (BD); Chung Lai Chan, Kowloon (HK); Ka Wai Chan, Aberdeen (HK)

(73) Assignee: Pismo Labs Technology Limited, Kowloon (HK)

( * ) Notice: Subject to any disclaimer, the term of this patent is extended or adjusted under 35 U.S.C. 154(b) by 381 days.

(21) Appl. No.: 16/322,048

(22) PCT Filed: Sep. 7, 2017

(86) PCT No.: PCT/IB2017/055383
§ 371 (c)(1),
(2) Date: Jan. 30, 2019

(87) PCT Pub. No.: WO2019/048905
PCT Pub. Date: Mar. 14, 2019

(65) Prior Publication Data
US 2020/0050517 A1   Feb. 13, 2020

(51) Int. Cl.
*G06F 9/445* (2018.01)
*G06F 11/14* (2006.01)
*H04L 12/24* (2006.01)

(52) U.S. Cl.
CPC ......... *G06F 11/1469* (2013.01); *G06F 9/445* (2013.01); *G06F 9/44505* (2013.01);
(Continued)

(58) Field of Classification Search
None
See application file for complete search history.

(56) References Cited

U.S. PATENT DOCUMENTS 7,822,718 B1 * 10/2010 Wilson ............... H04L 41/0856
707/684
9,117,063 B2 * 8/2015 Le ........................... H04L 67/14
(Continued)

FOREIGN PATENT DOCUMENTS

CN       1881891 A    12/2006
CN       103744751 A   4/2014
(Continued)

OTHER PUBLICATIONS

International Search Report in International Application No. PCT/IB2017/055383, dated Jun. 7, 2018.
(Continued)

*Primary Examiner* — Tanh Q Nguyen
(74) *Attorney, Agent, or Firm* — FisherBroyles, LLP; Victoria L. Boyd; Allen Kim

(57) ABSTRACT

The present invention relates to a method for determining a configuration operable by a configurable electronic device. The device receives a second configuration and a predefined parameter. The device archives a first configuration in the non-transitory computer readable storage medium. The device applies the second configuration and then determine whether the predefined parameter is satisfied. When the predefined parameters are satisfied, the device maintains to apply the second configuration. When the predefined parameter is not satisfied, the device retrieves the first configuration and applies the first configuration.

20 Claims, 11 Drawing Sheets

(52) U.S. Cl.
CPC .......... *G06F 11/14* (2013.01); *G06F 11/1446* (2013.01); *G06F 11/1448* (2013.01); *G06F 11/1461* (2013.01); *H04L 41/0803* (2013.01); *H04L 41/0813* (2013.01); *H04L 41/0856* (2013.01); *H04L 41/0863* (2013.01); *H04L 41/0869* (2013.01)

(56) References Cited

U.S. PATENT DOCUMENTS

| | | | | |
|---|---|---|---|---|
| 9,720,700 | B1* | 8/2017 | Brown | G06F 13/4068 |
| 10,116,619 | B2* | 10/2018 | McCallum | H04L 61/2015 |
| 2002/0188778 | A1* | 12/2002 | Iwanojko | H04L 41/0863 |
| | | | | 710/104 |
| 2007/0286206 | A1* | 12/2007 | Horn | H04W 36/0055 |
| | | | | 370/395.31 |
| 2009/0204701 | A1* | 8/2009 | Herzog | H04L 41/0869 |
| | | | | 709/224 |
| 2013/0219481 | A1* | 8/2013 | Voltz | H04L 63/20 |
| | | | | 726/9 |
| 2014/0280833 | A1* | 9/2014 | Gao | H04L 41/0863 |
| | | | | 709/223 |
| 2014/0379881 | A1* | 12/2014 | Bradley | H04L 41/147 |
| | | | | 709/221 |
| 2016/0219077 | A1* | 7/2016 | Pandya | H04L 63/20 |
| 2016/0299771 | A1 | 10/2016 | Navarro et al. | |
| 2018/0241846 | A1* | 8/2018 | Narayanan | H04L 41/0889 |
| 2020/0050517 | A1* | 2/2020 | Haque | G06F 9/44505 |

FOREIGN PATENT DOCUMENTS

| | | |
|---|---|---|
| CN | 105068969 A | 11/2015 |
| CN | 106376041 A | 2/2017 |

OTHER PUBLICATIONS

Written Opinion of the International Searching Authority in International Application No. PCT/IB2017/055383, dated Jun. 7, 2018.
English translations of Abstract of CN 106376041 (A), published on Feb. 1, 2017.
English translations of Abstract of CN 1881891 (A), published on Dec. 20, 2006.
English translations of Abstract of CN 103744751 (A), published on Apr. 23, 2014.
English translations of Abstract of CN 105068969 (A), published on Nov. 18, 2015.

* cited by examiner

CONFIGURATION ROLLBACK BASED ON THE FAILURE TO SATISFY PREDEFINED CONDITIONS

TECHNICAL FIELD

The present invention relates to configurable electronic devices, and more particularly to an improved method and apparatus for configuration rollback within configurable electronic devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many electronic devices, referred to herein as "configurable electronic devices" are electronic devices that provide mechanism to its user to create and/or modify its functions to perform specific tasks. For example, a network router that provides mechanism to its user to configure its IP address to communicate with one or more Layer-3 devices, is a configurable electronic device. Another example is televisions that comprise mechanism to be programmed by its user to record video from a specific channel at a specific time. Another example is Smart-Refrigerators that can be configured to alert its user when a specific food-item goes below a predetermined quantity as stored in the refrigerator.

A configurable electronic device is capable of performing the various tasks given as example above without requiring alterations made to its systems design as created by its manufacturer. Making alteration to the systems design of a configurable electronic device means altering the hardware, software or firmware of configurable electronic device in such a way that it becomes capable of performing one or more tasks not designed by the manufacturer to be performed by the device, or it becomes incapable of performing one or more tasks designed by the manufacturer to be performed by the device.

For example, multiple Ethernet interfaces of a configurable electronic device such as a multiport network router can be configured to be bridged together to make those ports act as a single switch if that operation is supported by the router's systems design. But individually those ports cannot be configured to achieve a higher data throughput rate beyond their hardware limitation. For example, a Fast-Ethernet port cannot be configured to achieve the throughput rate of a Gigabit-Ethernet port without making alterations to its systems design.

For another example, many networking devices have a limit set by the manufacturer on the maximum number of concurrent telnet or SSH sessions supported by the device. It is not possible to use a number of concurrent telnet or SSH sessions higher than the one set by the manufacturer without making alterations to its systems design.

Another example of configuring an electronic device according to its systems design is televisions that provide a mechanism to store channels in a sequence determined by the user. When a user of that television stores the channels in a sequence determined by himself/herself, he/she is configuring the television according to its systems design. But the televisions that are manufactured only to receive analog signals are not capable of receiving digital signals, without having alterations made to their systems design.

Configurable electronic devices include general purpose computer systems such as desktop computers, laptop computers, server computers, tablet computers, Smartphones, Personal Digital Assistant (PDA), or special purpose computer systems e.g. networking devices such as routers, managed switches, Wireless Access Points (WAP), or network security devices such as firewalls, Intrusion Prevention Systems (IPS), Intrusion Detection Systems (IDS) etc. configurable electronic devices may further include electromechanical devices used in, but not limited to, industrial engineering or healthcare systems. Any configurable electronic appliances such as televisions, smart-refrigerators, smart-televisions, smart-cars or medical devices especially in the context of Internet of Things (IoT) are also configurable electronic devices. Any configurable electronic system or a subsystem such as controller-units used in microwave-based devices such as satellites or radars, or in navigational devices such as Global Positioning Systems (GPS) or Sonars are also configurable electronic devices.

Compared to configurable electronic devices, non-configurable electronic devices do not comprise this mechanism to provide its user to create and/or modify its functions to perform specific tasks without making alterations to its systems design. Examples of non-configurable electronic devices are electronic doorbells that produce only preset sounds, Uninterruptible Power Supply (UPS), voltage stabilizers, non-programmable calculators and calculators that do not have the function to store information, remote controller units for televisions, air-conditioners etc., network hubs, unmanaged network switches, computer keyboards and mouse, among many other.

Most conventional configurable electronic devices comprise a mechanism to receive directives knows as commands or instructions from its user according to which it performs one or more tasks. There are typically two types of commands that are issued to a configurable electronic device. One type of commands, referred to herein as "configuration instructions", instruct a configurable electronic device to make alterations to its configuration. The other type of commands does not instruct configurable electronic device to make alterations to its configuration. The second type of commands are typically used to view configuration or status of various system parameters.

Many conventional configurable electronic devices comprise a mechanism, referred to herein as a "management interface" to receive instructions locally or remotely. Management interfaces typically comprise both input mechanisms to receive instructions from its user and output mechanisms to provide information to its user. By interacting with the management interface, various clients or users, such as human users and automated scripts, can perform configuration tasks. The management interface typically includes a Command Line Interface (CLI), a Graphical User Interface (GUI) or a Touchscreen. The management interface may also comprise mechanisms to receive the configuration instructions from other interactive communication protocols such as, but are not limited to, USSD, MMI or SMS in an interactive way.

Configuration instructions can also be received or retrieved by a configurable electronic device without using a management interface. When the configuration instructions are not received through the management interface, they can be received from, without limitations, a local or remote database or retrieval system, an SMS, email, from a client individually or as a group in the form of a string of text, a script, or as an file executable by the device. There is no limitation on the source or format of the instructions as long as they can be interpreted and processed by the device.

The configuration according to which a configurable electronic device functions while it is operating is known as its operational-configuration. The operational-configuration can be either modifiable or non-modifiable according to the systems design of the device. In a typical prior art configurable electronic device, the operational-configuration is stored in the primary memory of the configurable electronic device and can be directly modified through the management interface of configurable electronic device. Operational-configuration is also known as Running configuration in some prior art devices.

According to many conventional configurable electronic devices, an archived configuration is a configuration that is saved in a data retrieval system. A data retrieval system comprises a non-transitory or non-volatile storage medium comprised in configurable electronic device itself or comprised in a remote computing device such as a FTP/TFTP server or a storage device. The term non-transitory or non-volatile storage medium includes, but is not limited to, read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card, a Subscriber Identity Module (SIM) card and/or other machine readable mediums for storing information. The term "machine-readable medium" includes, but is not limited to, portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

Many conventional configurable electronic devices comprise a mechanism to archive its configuration, which is typically an operational-configuration, and use it as the default configuration when a configurable electronic device boots up the next time. This configuration is known as the boot-up configuration. The Boot-up configuration is also called startup configuration in some prior art devices.

According to many conventional configurable electronic devices, configuration rollback is a mechanism to retrieve an archived configuration and use it as its operational-configuration. Configuration rollback is typically used when going back to a particular previous state of operation is intended without reconfiguring a configurable electronic device manually. Configuration rollback is also used in some prior art networking devices when some unwanted result occurs. One such unwanted result is the management interface being inaccessible from a remote node. When a configuration rollback is performed by the device, a selected archived configuration is loaded from the secondary memory to the primary memory of the device.

According to some prior art mechanism when a configuration-rollback is performed, the existing operational-configuration is completely replaced by the archived configuration.

According to some prior art mechanism when a configuration-rollback is performed, a configurable electronic device compares the two configurations and applies only the differences. For example, if in the archived configuration the hostname of a network router is "Router1" and no IP address is configured on the first network interface, and in the operational-configuration the hostname of a network router is "Router2" and the IP address configured on the first network interface is 1.1.1.1, then during the rollback the hostname will be changed to "Router1" while the IP address of the first network interface will be kept as 1.1.1.1. One method to compare the two configurations is by generating text-based scripts from the configurations and performing a data-comparison operation using a program such as 'cliff'.

The operations of receiving, retrieving, applying, archiving or rolling back configuration or configuration instructions are typically known as configurational-operations in prior art.

In many conventional configurable electronic devices, a login session is used to particularly identify a session or time-period between when a user or an administrator of the system logs in to the system and logs out of the system. Logging out of the system can be done either manually by the user or administrator himself, or the system can logout that person forcefully in case of inactivity after a predefined time period or any other predefined reason such as password-expiration policy or unauthorized activity of the person. It is also possible that a script performs the action of logging in and out of the system, instead of a human person.

When a configurable electronic device is configured to perform one or more particular tasks, the successful accomplishment of those tasks by the configurable electronic device is referred to herein as the "expected outcome". For example, if an administrator applies one or more instructions to configure the IP address of a network interface of a router to make it communicate with a particular Layer-3 device, the expected outcome in this case is that the router is able to communicate with that particular Layer-3 device after updating its operational-configuration according to those instructions. For another example, if a Smart-TV is configured to record video stream from a specific channel staring at a specific time and ending at a specific time, the expected outcome is that the television is able to perform that task.

Typically, when the expected outcome is not achieved because of wrong configuration, the administrator re-configures configurable electronic device until the expected outcome is achieved. When the expected outcome is not achieved due to problem with the device's system, a system troubleshooting is performed before retrying the configuration. When the expected outcome is not achieved due to external factors such as, but not limited to, unavailability of a network link or a network resource, troubleshooting of those factors are required before the expected outcome can be expected from the new configuration.

In some situations, where the expected outcome is not achieved due to wrong configuration, the outcome might result in the configurable electronic device becoming inoperable or the management interface of configurable electronic device becoming locally or remotely inaccessible to the administrator. If the management interface becomes locally inaccessible from this unexpected outcome, the administrator can perform local troubleshooting operations to resolve the issue. But if the management interface becomes remotely inaccessible from the unexpected outcome, it sometimes becomes impossible for the administrator to undo the last changes made and make the configurable electronic device remotely accessible again.

Some prior art configurable networking devices provide one or more mechanisms that partially resolve this issue by providing the administrator with an option to apply the new configuration temporarily. If the new configuration is not confirmed within a predetermined time period by the administrator either intentionally or due to the management interface becoming remotely inaccessible to the administrator due to the new configuration, the router performs a rollback operation to restore the state of the configurable electronic device before the changes were made. In some prior art devices this confirmation time period is not used, rather a special mode of configuration is used. Any configuration changes made inside this special mode are not saved unless confirmed by the administrator. Hence, if the new configuration is not confirmed by the administrator either intentionally or due to the management interface becoming remotely inaccessible to the administrator due to the new configuration, the router performs a rollback operation to restore its operational state before the changes were made. After the previous state of configuration is restored, the administrator gets the management interface back.

It can be inferred from these prior art rollback methods that retaining remote access to the management interface is considered a mandatory expected outcome. But situations are possible where the management interface being remotely inaccessible is an expected outcome, or it is an acceptable consequence of an expected outcome. For example, there can be situations where the administrator may intentionally assign the IP address of the network interface of the Configurable Electronic Device he/she is connected to, to a IP address unreachable from the IP address of the network node he/she is connecting from. For another example, the administrator may create one or more Access Control List (ACL) rules in the Configurable Electronic Device that rejects any IP packet to or from the specific IP address the administrator is connecting from, or the whole IP subnet the administrator's IP belongs to. After applying either of these configurations, being disconnected from the configurable electronic device is an expected and acceptable outcome. There is a need in the art to provide a method to instruct the configurable electronic device not to perform a rollback in these situations. This new method should be available as an additional feature of the configurable electronic device, and not prevent the configurable electronic device from utilizing the rollback methods available in prior art devices.

When a Configurable Electronic Device is configured to perform one or more specific tasks, the expected outcome might not be achieved due to one or more reasons. These reasons include, but are not limited to, wrong configuration or one or more environmental-factors. The term "environmental-factor", mentioned herein, include hardware, software or firmware related problem of the configurable electronic device or similar problems of a locally attached or remote system. Environmental-factors may also include physical or Quality of Service (QoS) related issue of devices or links used by the configurable electronic device to communicate with remote systems. There is no limitation on what an environmental-factor can be as long as it can affect the expected outcome of a configurable electronic device corresponding to a particular configuration.

For the networking related example in the previous paragraph, environmental-factors can include, but are not limited to, the absence or poor QoS of the network link between the router and the Layer-3 device, or hardware problem of the corresponding network interface of the router, due to which the devices cannot communicate even if the configuration is correct. Another example of environmental-factor due to which expected outcome might not be achieved is duplicate hostname or IP address in the same Local Area Network (LAN). For the television-related example in the previous paragraph, environmental-factors can include, but are not limited to, the absence of video signal from the particular channel or lack of enough storage space to store the recorded video.

In the context of IoT, where a plurality of devices may communicate with each other to exchange information, a possible environmental-factor for one particular Configurable Electronic Device can be, but is not limited to, information received from other configurable electronic devices. For example, one Smart-Refrigerator in a household might determine whether a particular food item needs to be replenished by further determining whether that particular food item is in stock in other Smart-Refrigerators in that particular household. In such cases, if a particular Smart-Refrigerator is configured to send an SMS to the owner when a particular food item goes below a predetermined quantity, it might not be able to perform that operation if it cannot communicate with other Smart-Refrigerators of that household due to a network problem.

Some conventional prior art devices, especially network routers, comprise a mechanism of configuration rollback when the expected outcome is not achieved. But there is lack of a mechanism in prior art configurable electronic devices to provide the administrator option to efficiently and extensively define whether to perform the rollback by taking the state of the relevant environmental-factors into account.

For example, if after applying a correct site-to-site VPN configuration, a router is unable to establish VPN connection with a server due to that particular server being offline, the router determines that the expected outcome has not been achieved. In such cases many prior art routers provide the administrator an option to select whether to perform the rollback or not. But if there is a possibility of that the server will become available after a few hours, there is a lack in the art that would enable the administrator to apply the configuration with the condition to rollback by taking that information into account.

For another example, if a Smart-TV is configured to record video stream from a specific Television channel while video signal from that channel is unavailable, using prior art mechanisms the Smart-TV may determine that expected outcome is not achieved. In such cases the Smart-TV may perform a configuration-rollback if it is configured to do so. But if there is a possibility that that particular channel will become available after a specific time period, then there is a lack in the art that would enable the administrator to apply the configuration with the condition to rollback by taking that information into account.

When the configurational operations are done in real-time, the administrator can determine whether to perform a rollback operation by taking the current state of the relevant environmental-factors into account. But if the configuration is scheduled to be applied later, the administrator is likely to be unable to predict the future state of the relevant environmental-factors, hence he/she is also unable to efficiently determine whether to perform the rollback operation in that case.

It can be inferred from the above examples that when decision needs to be made on whether to perform a configuration-rollback based on the future state of relevant environmental-factors, prior art devices lack mechanisms to efficiently and extensively define conditions based on which a configurable electronic device may make this decision.

It is possible in a configurable electronic device that some problem with environmental-factors such as hardware or software components, or any combination thereof, become resolved after some time. For example, an operating system that is unable to perform a particular task might become able to perform that particular task after one or more of its software components are updated. For another example, a PC that is failing to store data due to lack of disk space might become able to do so after its storage space is increased through deletion of unnecessary files. Problem with environmental-factors that become resolved after some time are also typical in computer networks. Such problems include, but are not limited to, unavailability of a network resources, network congestion, high latency or connectivity failure. When the expected outcome is not achieved, some prior art systems comprise a mechanism to wait a suitable amount of time and automatically retry the operation again. This retry operation is typically performed for a predetermined time period, a predetermined maximum number of times, or until the expected outcome is achieved. This process is referred to as "retry-attempt" herein.

There is a need in the art to utilize this mechanism of retry-attempts in a flexible and convenient way on any configurable electronic device as applicable to its systems design. Using the example of Smart-TV mentioned earlier, if the expected outcome is not achieved from the configuration due to lack of storage space to store the video, the art should provide a mechanism for the administrator to instruct the configurable electronic device to keep retrying at suitable intervals to determine to whether enough storage space has become available. The Smart-TV will not rollback to the previous configuration until the maximum retry limit has been reached. This mechanism is particularly helpful when the administrator knows that there is a chance of the storage space issue being resolved in future.

Considering all the above mentioned issues, there is lack of a mechanism in prior art that would enable an administrator of a configurable electronic device to define, with enough flexibility and efficiency, whether to perform a configuration rollback.

DISCLOSURE OF INVENTION

Summary

The present invention relates to a method for determining a configuration operable by a configurable electronic device. The device receives a configuration session initiation request for initiating a configuration session from the management interface. The device then determines whether a configuration session lock is locked or not. When the configuration session lock is locked, the device rejects the configuration session initiation request. When the configuration session lock is not locked, the device accepts the configuration session initiation request and generates a new configuration session identifier for identifying the configuration session. The device receives a configuration session lock mode from the management interface and then sets a configuration session lock mode. The device then sets the configuration session to a first state. The device receives a second configuration and a predefined parameter. The device archives a first configuration in the non-transitory computer readable storage medium. The device applies the second configuration and then determine whether the predefined parameter is satisfied. When the predefined parameters are satisfied, the device maintains to apply the second configuration. When the predefined parameter is not satisfied, the device retrieves the first configuration and applies the first configuration. The device sets the configuration session to a second state.

The first state of the device is an active state. The active state indicates that the configuration session is in operation. The second state of the device is an inactive state. The inactive state indicates that the configuration session is not in operation.

The new configuration session identifier is unique and is a process identifier. The configuration session lock mode comprises first and second modes. The first mode allows the configurable electronic device to reject any new configuration session initiation requests without receiving instructions from the management interface and the second mode allows the configurable electronic device to reject any new configuration session initiation requests upon receiving instructions from the management interface.

The management interface is a local or remote retrieval system. The predefined parameter is substantially based on an expected outcome of the second configuration. One of the expected outcomes is reachability of a destination.

DETAILED DESCRIPTION

Figure 1:
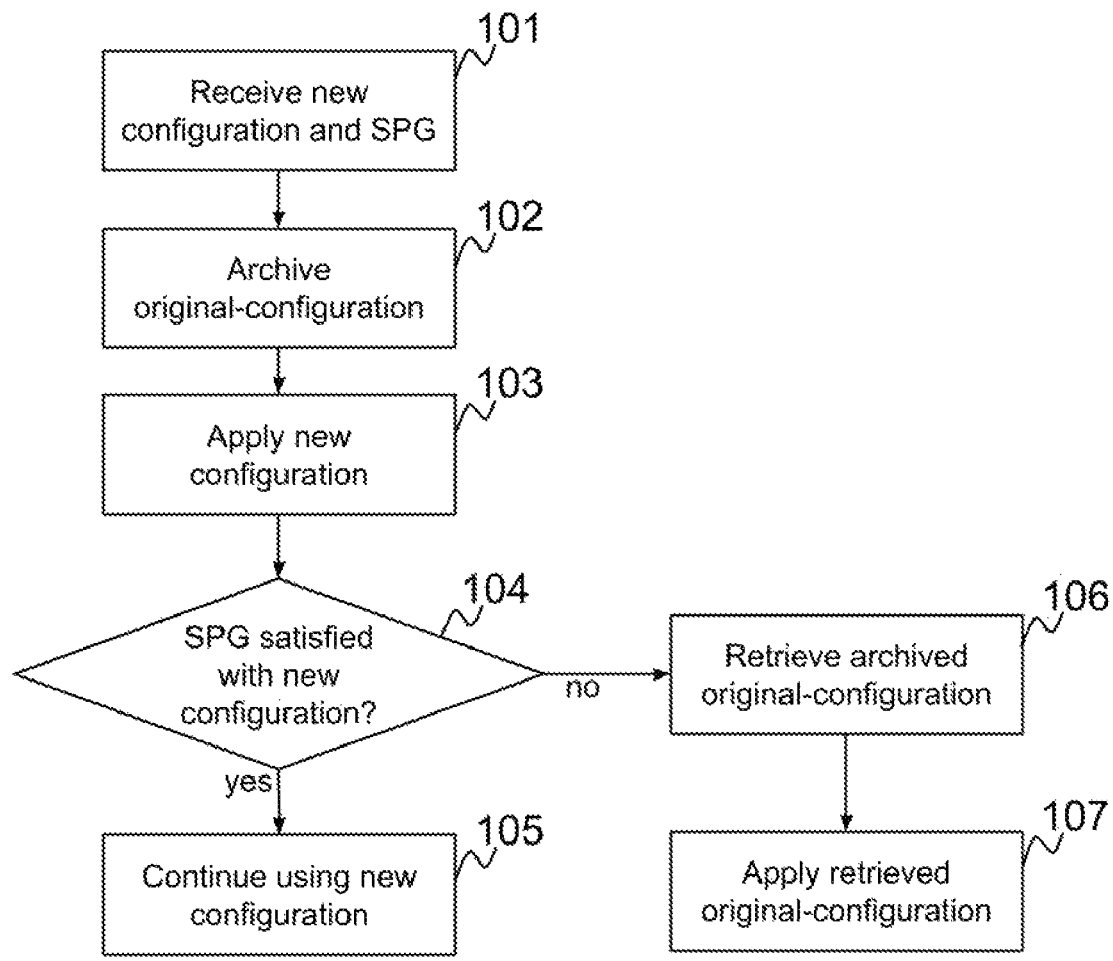
FIG. 1 is a flowchart illustrating example operation of a configurable electronic device performing a configuration rollback operation in accordance with one embodiment of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is illustrated as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term "non-transitory computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a non-transitory computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMAX, GPRS, EDGE, GSM, CDMA, Wi-Fi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

An information packet is a Protocol Data Unit (PDU) that contains control information, such as address information, and user data. An information packet can be a network layer PDU such as Internet Protocol (IPv4 or IPv6), a transport layer PDU such as Transmission Control Protocol (TCP) or User Datagram Protocol (UDP) or PDU of any other protocol that is capable of carrying information over a communication link.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The present invention is directed to a system and method which enable a configurable electronic device to determine whether to roll back an operational configuration to an archived configuration based on the failure to satisfy one or more predefined conditions. The predefined conditions are referred to herein as "success parameters". The present invention, more specifically, provides multiple methods detailing the creation of the success parameters by taking the state of various environmental-factors into account. Additionally, according to the present invention, multiple processes are provided detailing methods to increase the accuracy of determining whether to perform rollback operation by testing the configuration against the satisfaction of the success parameters using retry-attempts when necessary. Multiple methods are provided to implement the techniques both in single-user and multi-user environments. Determining whether to perform a rollback operation based on the above mentioned techniques mitigate the prior art problems or challenges described earlier.

According to one embodiment, a configurable electronic device determines whether to rollback to an archived configuration by further determining whether an individual success-parameter is not satisfied by an operational configuration. Whether an individual success-parameter is satisfied with an operational configuration or not, is herein referred to as the "state" of that particular success-parameter. The state of an individual success-parameter as determined by a configurable electronic device is either "satisfied" or "unsatisfied" which can be represented as a Boolean data, as either "True" or "False" respectively.

According to one embodiment, a configurable electronic device determines whether to rollback to an archived configuration by further determining whether a particular group of success-parameters are not satisfied by an operational configuration. A group of success-parameters, herein referred to as "success-parameter-group", comprises at least one success-parameters. For readability, the acronym "SPG" is used herein to refer to the phrase "success-parameter-group". Whether an SPG is satisfied with an operational configuration or not, is herein referred to as the "state" of that particular SPG.

According to the present invention, the state of an individual success-parameter or the state of an SPG, as determined by a configurable electronic device, is either "satisfied" or "unsatisfied" which can be represented as a Boolean data, as either "True" or "False" respectively. When more than one success-parameters are comprised in an SPG, the state of that SPG is determined by performing logical operations on the states of each success-parameters of that group. The logical operations performed on the states of the individual success-parameters can be performed in any number or combination as defined by the administrator or the manufacturer of the system.

As both the state of an SPG and the state of an individual success-parameter are Boolean data, either of them can be used similarly in an embodiment. Hence, unless exclusively stated herein, the mention of an SPG in an embodiment should also be presumed to describe a similar embodiment using an individual success-parameter in place of an SPG.

According to one embodiment, the state of only an individual environmental-factor is determined by a configurable electronic device before further determining whether an SPG is satisfied with the new configuration. The state of an individual environmental-factor as determined by a configurable electronic device is either "satisfactory" or "unsatisfactory" which can be represented as a Boolean data, as either "True" or "False" respectively.

According to one embodiment, the state of a particular group of environmental-factors is determined by a configurable electronic device before further determining whether an SPG is satisfied with the new configuration. A group of environmental-factors, herein referred to as "environmental-factor-group", comprises at least one environmental-factor. For readability, the acronym "EFG" is used herein to refer to the phrase "environmental-factor-group". Whether an EFG is satisfactory or not, is herein referred to as the "state" of that particular EFG. The state of an EFG as determined by a configurable electronic device is either "satisfactory" or "unsatisfactory" which can be represented as a Boolean data, as either "True" or "False" respectively. When more than one environmental-factors are comprised in an EFG, the state of that EFG is determined by performing logical operations on the states of each environmental-factors of that group. The logical operations performed on the states of the individual environmental-factors can be performed in any number or combination as defined by the administrator or the manufacturer of the system.

As both the state of an EFG and the state of an individual environmental-factor are Boolean data, either of them can be used similarly in an embodiment. Hence, unless exclusively stated herein, the mention of an EFG in an embodiment should also be presumed to describe a similar embodiment using an individual success-parameter in place of an EFG.

In one embodiment, a configurable electronic device receives the SPG prior to applying the configuration and determines the state of that SPG after applying the configuration.

In one embodiment, a configurable electronic device receives the SPG and also determines the state of that SPG prior to applying the configuration. This particular embodiment is only applicable to situations where determining the state of the SPG does not require a configurable electronic device to have the new configuration as operational.

According to the present invention, there is no limitation on which conditions an administrator can use to define a success-parameter as long as the conditions are determinable by a configurable electronic device. In practice it is more efficient to create success-parameters using conditions more relevant to the expected outcome. It depends on the skill of the administrator to create success-parameters more relevant to the expected outcome of the new configuration.

According to the present invention, the new configuration, the SPG and the EFG may be received by a configurable electronic device from an administrator individually, together or in any combination.

In one embodiment, the EFG is created by a configurable electronic device based on the environmental-factors determined by that configurable electronic device to be relevant to the SPG.

In one embodiment, the EFG or the state of the environmental-factors or both may be received from a remote computer or a data retrieval system.

In accordance with the techniques of the present invention, if reachability to a particular web server is the expected outcome of a configuration, then receiving ping replies from that particular machine where the web server is hosted may be defined as a first success-parameter. Furthermore, if possibility of a situation can be anticipated where the ICMP packets used in the ping process are being dropped due to firewall rules of either or both of the communicating devices, then second and third success parameters can be defined for determining whether the web server is reachable in the application layer via HTTP or HTTPS protocol respectively. Furthermore, if possibility of a situation can be anticipated where the web server is currently offline but will become available after some time, a fourth success parameter can be created to retry the first, the second and the third success parameters after specific time intervals and perform this retry-attempt for a specific number of times.

For the above scenario, an administrator may create an SPG comprising the four success-parameters mentioned above and have a configurable electronic device determine the state of the SPG by performing logical disjunction ("OR") on the state of all four success-parameters.

In another example, a particular configuration is created by an administrator for a configurable electronic device to perform a particular operation that will generate data of at least a particular size (e.g. in megabytes) that needs to be stored in an pre-assigned permanent storage. The particular operation may be performed immediately after applying the configuration, or at a later time as determined by the administrator. For this situation, the administrator may create a success-parameter which will be satisfied if storing of the entire data in the pre-assigned storage is successful. Additionally, in this example, there is a possibility that the required storage space may not be not available within the pre-assigned storage device at the time of performing the operation. There is also a possibility of the required storage space becoming available within the pre-assigned storage device in future because existing data from the pre-assigned storage device is moved to another storage device by a script. This operation of moving the data is done at time intervals unknown to the administrator. For this scenario, the administrator may create an environmental-factor which will be satisfactory when at least the required storage space in the pre-assigned storage device is available. Combining the technique to determine the state of this environmental-factor with the technique to retry determining the state of this environmental-factor, number of times and intervals predetermined by the administrator, provides the administrator with a more efficient technique to determine the state of the success-parameter.

According to one embodiment, there is no limitation on the method to use to define the conditions for the SPG and the EFG. According to this particular embodiment, the manufacturer of a configurable electronic device can use any known or hereafter developed programming language, scripting language, commands or such to be used individually or in a combined manner for this purpose.

Figure 10:
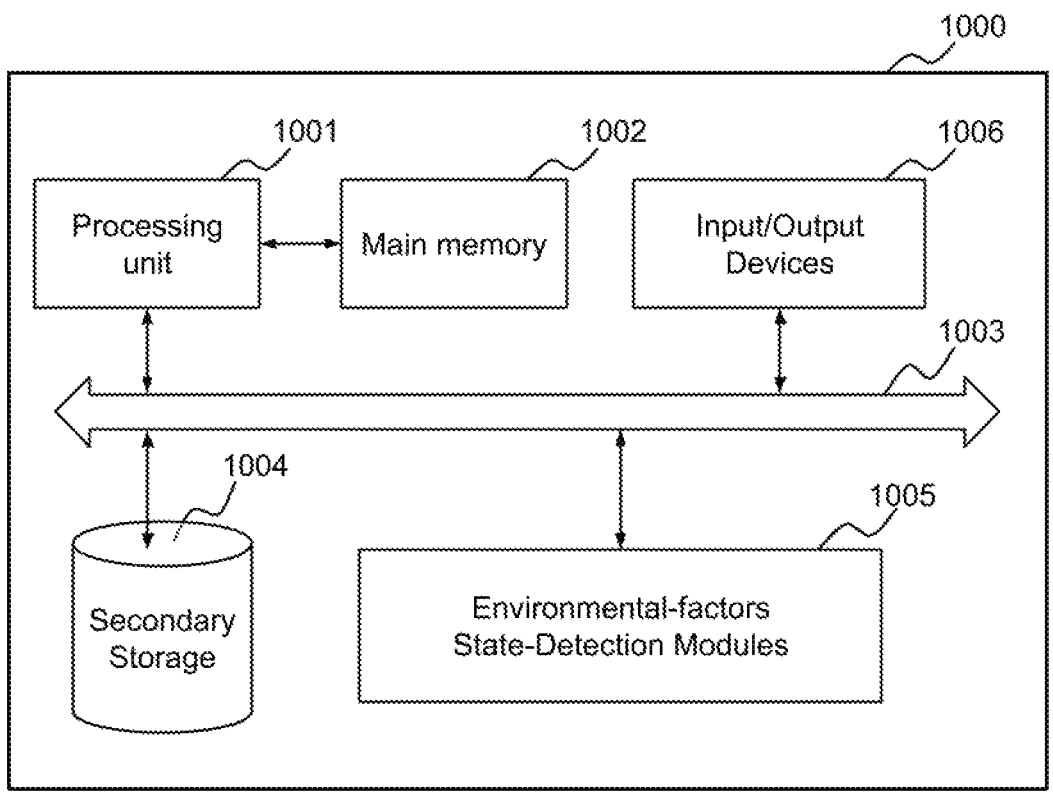
FIG. 10 is a block diagram of a configurable electronic device consistent with the principles of the present invention.

FIG. 10 is an illustrative block diagram of a configurable electronic device 1000 that may be used to implement the embodiments described herein. In one embodiment, the configurable electronic device 1000 is a programmable machine that may be implemented in hardware, software or any combination thereof. The configurable electronic device 1000 includes one or more processing units 1001, main memory 1002, system bus 1003, secondary storage 1004, Input/output (I/O) Devices 1006, and one or more environmental-factors state-detection modules 1005. Processing unit 1001 and main memory 1002 are connected to each other directly. Processing unit 1001 is connected to I/O devices 1006, secondary storage 1004, and environmental-factors state-detection modules 1005 through system bus 1003. System bus 1003 can be any of several types of bus structures including a memory bus, a peripheral bus, and a local bus using any of a variety of bus architectures. Secondary storage 1004 stores program instructions or configurations for execution by processing unit 1001. I/O devices 1006 typically include, but are not limited to computer keyboards, computer mice, computer monitors or other Human Interface Devices (HID).

Environmental-factors state-detection modules 1005 is any suitable combination of hardware, software, algorithms, processors, devices, modules, components, elements or subsystems operable to facilitate the gathering of information, or sensing or detecting the of state one or more environmental-factors. For readability, the acronym "EFSD" is used herein to refer to "environmental-factors state-detection". As network interfaces that are used for connecting to a network or a remote device are also used as a component to determine the state of the connection, EFSD modules 1005 may also comprise network interfaces. For example, EFSD modules 1005 can be, without limitation, network interfaces such as Ethernet interfaces, 3G network interfaces, 4G network interfaces, WiMAX network interfaces, serial interfaces, a virtual network interface of a virtual machine (VM), or any other network interface. These network interfaces use one or more communication links, where a communication link is in form of optical fiber, Ethernet, ATM, Frame Relay, T1/E1, IPv4, IPv6, wireless technologies, Wi-Fi, WiMAX, High-Speed Packet Access technology, 3GPP Long Term Evolution (LTE) or the like. EFSD modules 1005 can also include network interface controllers for any communication links, including the ones mentioned above.

EFSD modules 1005 may further be an individual or a combination of electronic, mechanical, chemical or biochemical sensors, probes, detectors, scanners or transducers such as, but not limited to, temperature sensors, photoelectric sensors, photodetectors, biosensors, gas sensors, smoke detectors, ampere meters, volt-meters, microphones, cameras, speedometers, accelerometer, proximity sensor, impact sensors, gyroscope, magnetometers, metal detectors, water meters, altimeters, barometers, compasses, Global Positioning Systems (GPS), infrared sensors, metal detectors, barcode reader, fingerprint scanner, facial recognition system, to sense, detect, calculate or measure the state of environmental-factors. In one embodiment, EFSD modules may comprise within themselves, or comprise a mechanism to connect to, Programmable Logic Device (PLC) to receive information. In one embodiment, EFSD modules may comprise within themselves General Purpose Input Output (GPIO) pins for send or receive signal or information.

In one embodiment, configurable electronic device 1000 is also a Network Management System (NMS) that is capable of receiving SNMP data through EFSD modules 1005. Also in this embodiment, configurable electronic device 1000 is capable of using the received SNMP data to determine whether to perform certain actions as applicable.

Typically, the EFSD modules will comprise a mechanism to receive both analog and digital input as necessary. The digital input may include, but not limited to, Protocol Data Units (PDU) such as Ethernet frames, IP packets, SMS or bit-stream. The analog data may include, but not limited to, audio signal, voltage level, light etc., which may be further converted to digital data by means of an Analog to Digital Converter (ADC) to be processed by processing unit 1001.

In one embodiment, configurable electronic device 1000 comprises a mechanism to optionally use network security systems such as network firewalls, Intrusion Detection Systems, Intrusion Prevention Systems to define and/or determine the success-parameters. There security systems may or may not be integrated with EFSD module for the purpose of determining the outcome of the predefined conditions.

It should be understood that the configurable electronic device 1000 shown in FIG. 10 as described above is only an example and that different configurations of configurable electronic device 1000 may be used to implement the methods described herein.

In one embodiment, a lock mechanism, referred to herein as "operational-configuration lock", is used that prevents any alteration to the operational-configuration. When configurable electronic device 1000 needs to archive the operational-configuration, it sets this lock to ON, forcefully preventing any alteration to be made to the configuration. This lock is removed or set to OFF as soon as the archiving operation is completed. The operation of setting and removing this lock is presumed to be included in all embodiments of the present invention, even if they are not mentioned in the corresponding descriptions or illustrated in the corresponding figures. For readability, the acronym "OCL" is used herein to refer to "operational-configuration lock".

In one embodiment according to the present invention, a particular session during which the configurable electronic device 1000 performs a particular group of related configurational operations is referred to herein as a "configuration-session". Configurational operations included within such a group of may be related by, but not limited to, a particular "event" or a particular administrator. Example of an event may include, but not limited to, receiving configuration from an individual command, configuration-script, SMS or Email. Another example of an event is performing one or more configurational-operations as a single group of operation by halting other concurrent configurational-operations if necessary. Each group of related configurational operations may be performed by different administrators, or they may be performed by different configuration-sessions of the same administrator.

According to the present invention a configuration-session can either be in an "ACTIVE" state or an "INACTIVE" state. The term ACTIVE when used for configuration-sessions herein refers to the state of a particular configuration-session that is operational. The term INACTIVE when used for configuration-sessions herein refers to the state of a particular configuration-session that is not operational.

According to the embodiments of the present invention that uses configuration-sessions, a configuration-session-initiation request must be issued by the entity intending to perform the configuration operation to the configurable electronic device. The entity may be an administrator or a process within the configurable electronic device. For readability, the acronym "CSIR" is used herein to refer to "configuration-session-initiation request". Configurable electronic device may or may not allow the particular entity to perform the configuration operations based on the state of configuration session-lock when the CSIR was issued. Configuration-session-lock is described more in detail hereinafter. According to the embodiments that use configuration-sessions, configurable electronic device 1000 individually assigns and identifies each stateful configuration-session by a unique identifier. For readability, this identifier number is herein referred to as "CSID". In one embodiment, CSID is a Process ID (PID) used by most operating systems.

According to the present invention, there is no limitation that configurational-operations must be performed inside a configuration-session. In one embodiment, configurational-operations are performed without using a configuration-session. This would help reduce the requirement of system resources such as memory and processor usage. This characteristic makes it more suitable to implement devices with less manufacturing cost. But as this particular embodiment does not comprise a mechanism to use configuration-sessions, it is not capable to perform operations that require configuration-sessions. Such operations include, but are not limited to, session-management operations, which is needed for efficient management of the configurational-operations, especially in a multi-user environment. According to the present invention, one example of session-management operation is accepting or rejecting a new CSIR based on a predetermined policy. Another such operation that require configuration-session is archiving or rolling back to configurations corresponding to a particular configuration-session. According to the present invention, the embodiments where configurable electronic device 1000 does not comprise a mechanism to perform the configuration operations using configuration-sessions, are not suitable for multi-user environments.

According to the embodiments that use configuration-sessions, the operational-configuration according to which configurable electronic device 1000 was operating when a particular configuration-session was set to ACTIVE, and before any changes were made to it, is referred to herein as the "original-configuration" of that particular configuration-session. Therefore, an original-configuration is a special type of operational-configuration. According to the embodiments that do not use configuration-sessions, the original-configuration is the boot-up configuration.

According to the embodiments that use configuration-sessions, when a configuration-session is set to ACTIVE, an OCL is immediately set on the corresponding original-configuration, the original-configuration is archived and the OCL is then removed from the original-configuration. This prevents modification of that original-configuration by either its corresponding configuration-session or any other configuration-sessions and ensures archival of the original-configuration in an unmodified state. According to this embodiment, each configuration-session has its own version of original-configuration.

According to one or more embodiment, a particular configuration rollback mechanism, referred to herein as "original configuration rollback", is used by configurable electronic device 1000 to rollback to an original-configuration. For readability, the acronym "OCR" is used herein to refer to "original configuration rollback". According to one embodiment that use configuration-sessions, all archival operations of the original-configuration archive the original-configuration in the same memory-location. Therefore, in this embodiment, when performing an OCR, an original-configuration archived earlier is replaced by the latest archived original-configuration, and only the latest archived original-configuration is available for retrieval. While this embodiment saves secondary memory, the replacement of original-configuration archived by one configuration-session with original-configuration archived by another configuration-session may create confusion among the administrators, create an unstable state of configurable electronic device 1000, or even make configurable electronic device 1000 inoperable.

According to one embodiment that use configuration-sessions, all archival operations of the original-configuration archive the original-configuration in a different memory-location. Therefore, in this embodiment, when performing an OCR, each original-configuration is archived separately and when performing a rollback operation, an administrator is provided with an option to select a particular archived original-configuration to retrieve. Although using this embodiment increases secondary memory usage, it provides a more efficient and user-friendly method of performing OCR.

Furthermore, when long step-by-step configurations are carried out by the administrators, performing an Original-configuration-rollback is cumbersome as it takes the configuration back to the start.

FIG. 1 is a flowchart illustrating steps performed by configurable electronic device 1000 according to one embodiment of the present invention. In this embodiment, configurable electronic device 1000 performs the configuration operations without using configuration-sessions. At step 101 configurable electronic device 1000 receives the new configuration and the SPG. At step 102 configurable electronic device 1000 archives its original-configuration in secondary storage 1004. At step 103 configurable electronic device 1000 applies the new configuration which then becomes the operational-configuration. At step 104 configurable electronic device 1000 determines if the SPG is satisfied with the operational-configuration after it has been changed according to the new configuration. If the SPG is satisfied, then at step 105 configurable electronic device 1000 continues with using the operational-configuration. If the SPG is not satisfied, then configurable electronic device 1000 rejects the new operational-configuration and at step 106 retrieves the archived configuration. Then at step 107 configurable electronic device 1000 applies the archived configuration as the operational-configuration.

According to the present invention, there is no limitation that TCP/IP protocol must be used to establish a login-session. Any other protocols or methods including, but not limited to, SMS, Bluetooth, Barcode, or biometric techniques such as fingerprint scanning, retina scanning, facial recognition etc., or a combination of multiple protocols or methods, can be used to establish a login-session as long as it provides proper mechanisms for logging in and logging out of the system. There is also no limitation that a login-session must be used to configure configurable electronic device 1000. For example, when configuring configurable electronic device 1000 without requiring real-time interaction from the administrator, the operations logging in and logging out of the system are not used. In such configurational operations, the method of sending the configuration instructions to configurable electronic device 1000 can be, but not limited to, for example, SMS. In case of SMS for example, a string of characters in the message can be used to identify and/or authenticate the administrator. Also any other identifiable parameter, such as the phone number or source IP address of the administrator can also be used for this purpose.

According to one embodiment of the present invention, an individual configuration command is a configuration command that instructs configurable electronic device 1000 to perform a particular task. Additionally, in this particular embodiment, a group of configuration commands are a plurality of individual configuration commands grouped together. Within a group of configuration commands, each subsequent individual configuration command is separated from its previous individual configuration command by a delimiter known to the configurable electronic device 1000. This delimiter may be predetermined by the manufacturer or an administrator of configurable electronic device 1000. Using this known delimiter enables configurable electronic device 1000 to individually identify each individual configuration command. Additionally, an individual configuration command or a group of configuration commands may include a precise starting and ending marker that respectively marks the start and end of that individual configuration command or that group of configuration commands. This starting and ending markers are also known to configurable electronic device 1000. Example of a starting or ending marker may be, but not limited to, an alphanumeric character or string predetermined by the manufacturer or an administrator of configurable electronic device 1000. Using these markers enables configurable electronic device 1000 to completely receive an individual configuration command or a group of configuration commands that may be fragmented during transmission due to the protocol used. For example, when using SMS as the method to send configuration commands, the commands may get fragmented if they are above 160 characters (i.e. the maximum length of an SMS PDU when using the GSM 03.38 standard). According to the present invention, receiving or retrieving an individual or a group of configuration commands is regarded as a single event by configurable electronic device 1000, herein referred to as a "configuration-event". Unless specifically mentioned, the term "configuration-command" is presumed to mean either an individual configuration-command or a group of individual configuration-commands.

In one embodiment, configurable electronic device 1000 uses stateless configuration-sessions. A stateless configuration-session is based on a single configuration-event. According to the embodiments of the present invention that use stateless configuration-sessions, configurable electronic device 1000 treats configuration-events independently from each other and does not create any relationship between them. One consequence of this is administrators of configurable electronic device 1000 being unable to perform the configurational operations in an interactive manner in real-time. Therefore, all necessary instructions are received at the beginning together with the CSIR. A stateless configuration-session may or may not require authentication, which is predetermined by an administrator or the manufacturer. A stateless configuration-session also does not belong to a login-session. Embodiments using stateless configuration-session are suitable for implementation in configurable electronic devices within which operations requiring high system resources need to be avoided while ensuring separation of configuration-session.

According to one embodiment, a particular time period is used to determine whether a particular login-session has expired. If there is no activity from the administrator detected by configurable electronic device 1000 within this time period, configurable electronic device 1000 determines that the particular login-session has expired. This time period is referred to herein as "Login-session Expiration Time". For readability the acronym "LSET" is used herein to refer to Login-session Expiration Time. LSET is measured in seconds. In one embodiment, the administrator has the freedom to select the value of LSET before applying a configuration. If the administrator does not set the value of LSET, configurable electronic device 1000 will use a default value. This default value is set by the manufacturer of configurable electronic device 1000 or calculated by configurable electronic device 1000 based on one or more relevant parameters. The relevant parameters may include, but is not limited to, protocol/method used for the login-session, QoS or metric values of the connection used for the login-session. In one embodiment the administrator is not given the option to set the value of LSET.

In one embodiment, configurable electronic device 1000 uses stateful configuration-sessions. A stateful configuration-session is a particular type of configuration-session within which all configuration-events are related to each other. All configuration-events within a stateful configuration-session are related to each other as they all correspond to the same CSID. In this embodiment, configurable electronic device 1000 comprises a mechanism to perform the configurational operations using real-time interaction with the administrator. Therefore, configurable electronic device 1000 is able to receive instructions from an administrator during the stateful configuration-session. A stateful configuration-session can be created within a login-session only. Furthermore, a stateful configuration-session is terminated if its corresponding login-session is expired or manually ended.

According to one particular embodiment of the present invention, an embodiment that performs configuration operations without using configuration-sessions, also comprises a mechanism to perform the configuration operations using configuration-sessions. Unless specifically mentioned, an embodiment that performs configuration operations without using configuration-sessions, does not comprise a mechanism to perform the configuration operations using configuration-sessions.

According to one particular embodiment of the present invention, an embodiment that comprises a mechanism to perform the configuration operations using stateful configuration-sessions, also comprises a mechanism to perform the configuration operations using stateless configuration-sessions. Unless specifically mentioned herein, an embodiment that comprises a mechanism to perform the configuration operations using stateful configuration-sessions, does not comprise a mechanism to perform the configuration operations using stateless configuration-sessions. Unless specifically mentioned herein, an embodiment that comprises a mechanism to perform the configuration operations using stateless configuration-sessions, does not comprise a mechanism to perform the configuration operations using stateful configuration-sessions.

In one embodiment, more than one configuration-sessions are not allowed by configurable electronic device 1000 concurrently regardless of whether they belong to the same or different login-sessions.

In one embodiment, more than one configuration-sessions are allowed by configurable electronic device 1000 concurrently only if they belong to different login-sessions.

In one embodiment, more than one configuration-sessions are allowed by configurable electronic device 1000 concurrently regardless of whether they belong to the same or different login-sessions.

According to the present invention, a configuration-session can be terminated either manually by an administrator or by configurable electronic device 1000 if the login-session corresponding to that particular configuration-session ends. A configuration-session can also be terminated due to other one or more predefined reasons, such as, according to one embodiment of the present invention an administrator can forcefully terminate the configuration-session of another administrator.

In one embodiment, configurable electronic device 1000 comprises an optional lock mechanism to reject CSIR while a configuration-session is active. This mechanism is herein referred to as "configuration-session-lock". For readability, the acronym "CSL" is used herein to refer to "configuration-session-lock". Within the operational-configuration of configurable electronic device 1000, CSL is used as one particular flag-bit that can be either "ON" or "OFF". When CSL is ON, it is linked with the particular configuration-session for which it is set to ON. The CSL flag is set to OFF by default and it is not set to ON unless instruction is given to configurable electronic device 1000 to do so. In the embodiments that use CSL, the mode of CSL to be used with a new configuration-session is herein referred to as the "CSL mode". For readability, the acronym "CSLM" is used herein to refer to "CSL mode". CSLM is an instruction which can be either "ON" or "OFF". CSLM for a configuration-session is determined by the owner of that particular configuration-session. According to the embodiments that use stateless configuration-sessions, CSLM is issued together with the CSIR. According to the embodiments that use stateful configuration-sessions, CSLM is received from an administrator in an interactive manner immediately before using it.

In one embodiment, if CSL is set to ON, configurable electronic device 1000 rejects any new CSIR and no other concurrent configuration-sessions are possible. Also in this embodiment, if the CSL is set to OFF, other concurrent configuration-sessions are possible. In the embodiments that use stateless configuration-sessions and does not use stateful configuration-sessions, the instruction on how to set the CSL flag is given with the CSIR. In the embodiments that use stateful configuration-sessions and does not use stateless configuration-sessions, the instruction on how to set the CSL flag is received from the administrator interactively after the CSIR is accepted.

In one embodiment, after configurable electronic device 1000 accepts a CSIR, it creates a configuration-session corresponding to the request and a CSID for that particular configuration-session. configurable electronic device 1000 then performs one or more operations as applicable to a corresponding embodiment of the present invention. One example of such operation is receiving new CSL mode from the administrator of the newly created configuration-session. Then configurable electronic device 1000 sets the configuration-session as "ACTIVE". The term ACTIVE when used for configuration-sessions herein refers to the state of a particular configuration-session that is operational. Inside an active configuration-session an administrator can perform both configurational-operations and other operations not directly related to configuring the device. These other operations include, but are not limited to, viewing configurations or system status.

According to the embodiments that use stateless configuration-sessions, the desired CSL mode for a particular configuration-session is received along with the CSIR. According to the embodiments that use stateful configuration-sessions, the operations of receiving the desired CSL mode from an administrator for a particular configuration-session and setting the received CSL mode are performed immediately before setting that particular configuration-session as ACTIVE.

In one embodiment of the present invention, when an administrator issues a CSIR to configurable electronic device 1000 while there is a pre-existing CSL, the new CSIR is rejected. But when there is no pre-existing CSL, the new CSIR is accepted. In this particular embodiment the administrator is given an option to lock the configuration-session which, similarly, another administrator cannot override.

According to one embodiment, if multiple configuration-sessions exist that have the CSL set to OFF, then those configuration-sessions can function concurrently. Therefore, multiple administrators can make changes to the operational-configuration concurrently. This gives the advantage of multiple administrators working on configurable electronic device 1000 at the same time, which can be particularly helpful when team-work is needed. But the disadvantage of this is that conflicting configuration changes from multiple administrators might result in an unstable state of the system.

Figure 2:
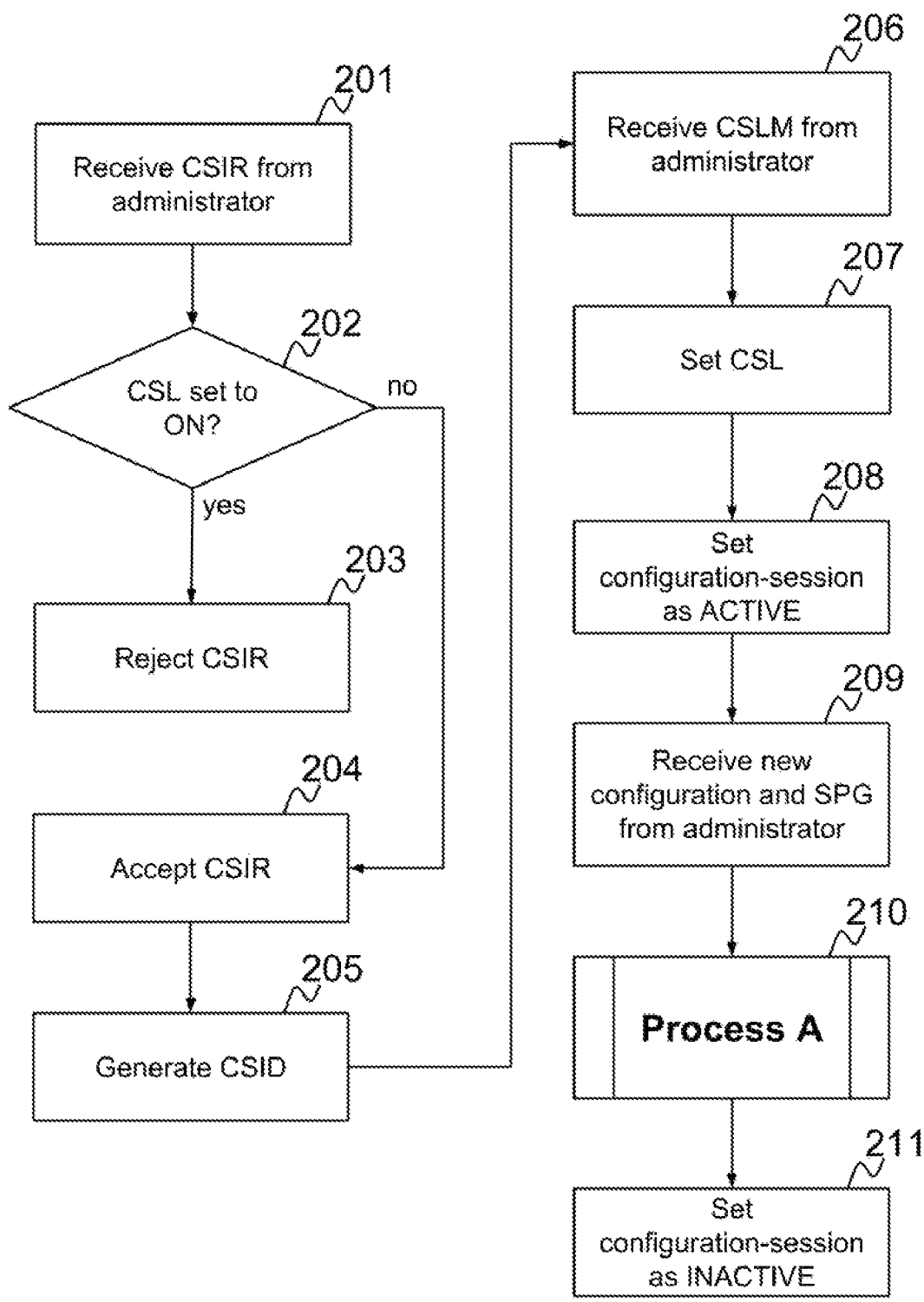
FIG. 2 is a flowchart illustrating example operation of a configurable electronic device performing a configuration rollback operation in accordance with one embodiment of the present invention.

FIG. 2 is a flowchart illustrating a variant of the embodiment illustrated in FIG. 1. In this particular variant, configurable electronic device 1000 comprises a mechanism to use stateful configuration-sessions to perform the configurational-operations. Furthermore, in this particular variant the CSL flag is used to determine whether to reject a new CSIR. If a new CSIR is accepted, the administrator is provided with the option to select whether to set CSL to ON. FIG. 2 should be viewed in conjunction with FIG. 1 to better understand the variant. At step 201 configurable electronic device 1000 receives a CSIR from an administrator. When a new CSIR is issued to configurable electronic device 1000, it can be in one of three states: (a) No configuration-session is pre-existing within configurable electronic device 1000, (b) One or more configuration-sessions with CSL set to OFF are pre-existing within configurable electronic device 1000, or (c) Only one configuration-session with CSL set to ON is pre-existing within configurable electronic device 1000. At step 202 configurable electronic device 1000 determines if CSL is already set to ON. If CSL is ON, then at step 203 configurable electronic device 1000 rejects the CSIR without providing the administrator with an option to override it. If CSL is OFF, then at step 204 configurable electronic device 1000 accepts the CSIR. At step 205 configurable electronic device 1000 generates a CSID for the received CSIR. At step 206 configurable electronic device 1000 receives the CSLM to be used with the newly created configuration-session. At step 207 configurable electronic device 1000 sets the CSL according to the CSLM received from the administrator at step 206. If the administrator has selected CSLM as ON, then at this particular step all other pre-existing configuration-sessions are forcefully ended by the system. If the administrator has selected the CSLM as OFF, then other pre-existing configuration-sessions are kept running. At step 208 configurable electronic device 1000 starts the newly created configuration-session by setting it as "ACTIVE". At step 209 configurable electronic device 1000 receives the new configuration and the SPG from the administrator. At step 210 configurable electronic device 1000 performs "Process A". Process A comprises steps 102 to 107 of FIG. 1. At step 211 configurable electronic device 1000 ends the configuration-session by setting it "INACTIVE". In this particular variant, step 211 is the subsequent step for both steps 105 and 107.

In one embodiment, if a CSIR is issued to configurable electronic device 1000 while CSL is already set to ON, configurable electronic device 1000 comprises an optional mechanism to override the existing CSL and accept the CSIR. This option is particularly helpful for an administrator who wants to configure the device but is unable to do so because of a pre-existing CSL that is set to ON. Also in this embodiment, if the CSL is set to OFF, other concurrent configuration-sessions are possible without the need to override the CSL. The instruction to override a pre-existing CSL is herein referred to as "CSLO". In one embodiment, if CSLO is set to ON, then the pre-existing configuration-session is terminated and rollback is performed to restore the state of the operation-configuration before any changes were made by the terminated configuration-session. In one embodiment, if CSLO is set to ON, then the pre-existing configuration-session is terminated and the changes made to the operation-configuration made by the terminated configuration-session is kept. In one embodiment that uses stateful configuration-sessions, if CSLO is set to ON, then the owner of the pre-existing configuration-session is informed of the override operation and is provided with an option to continue with the ongoing configuration-session with CSL set to OFF. In one embodiment, the decision on how to set the CSLO is determined by the administrator who issues the CSIR. According to the embodiments that use stateless configuration-sessions, instruction on how to set the CSLO is issued together with the CSIR. According to the embodiments that use stateful configuration-sessions, instruction on how to set the CSLO is received from an administrator in an interactive manner immediately before determining whether CSLO is set to ON.

Figure 3:
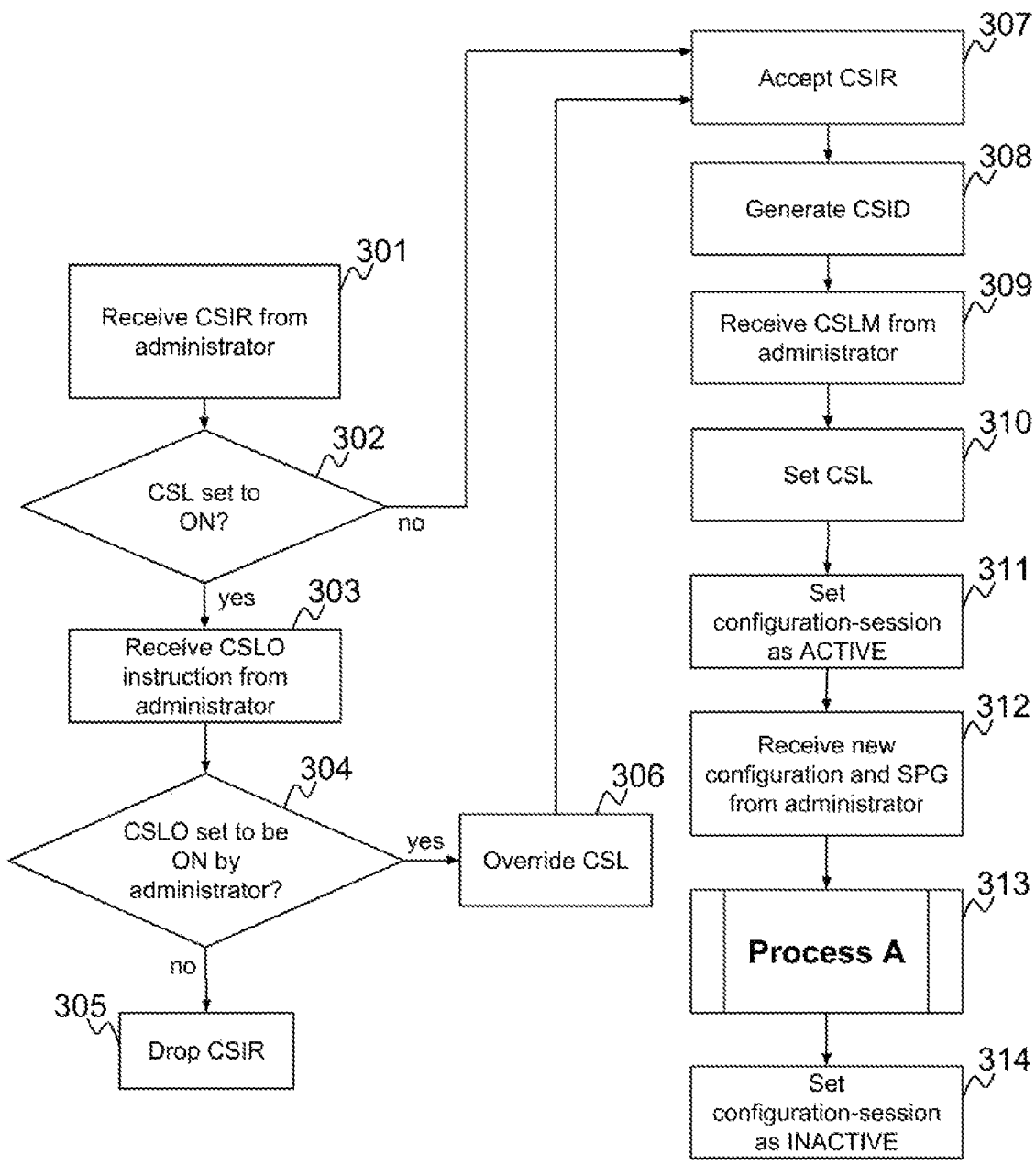
FIG. 3 is a flowchart illustrating example operation of a configurable electronic device performing a configuration rollback operation in accordance with one embodiment of the present invention.

FIG. 3 illustrates another variant of the embodiment illustrated in FIG. 1. In this particular variant, configurable electronic device 1000 comprises a mechanism to perform the configurational-operations using stateful configuration-sessions. Additionally, in this particular variant configurable electronic device 1000 comprises a mechanism to use CSLO. FIG. 3 should be viewed in conjunction with FIG. 1 to better understand the variant. At step 301 configurable electronic device 1000 receives a CSIR from an administrator. At step 302 configurable electronic device 1000 determines if the CSL is already set to ON. If the CSL is already set to ON, then at step 303 configurable electronic device 1000 receives CSLO instruction from administrator. If at step 302 configurable electronic device 1000 determines that CSL is not set to ON, then it proceeds to step 307 to accept the CSIR. At step 304 configurable electronic device 1000 determines if the administrator has set CSLO to ON. If the administrator has not set CSLO to ON, then at step 305 configurable electronic device 1000 drops the CSIR. If at step 304 the administrator has set CSLO to ON, then at step 306 configurable electronic device 1000 overrides the pre-existing CSL. Then configurable electronic device 1000 proceeds to step 307 and accepts the CSIR. At step 308 configurable electronic device 1000 generates a CSID corresponding to the received CSIR. At step 309 configurable electronic device 1000 receives CSLM from the administrator for this particular configuration-session. At step 310 configurable electronic device 1000 sets the CSL according to the CSLM received from the administrator at step 309. At step 311 configurable electronic device 1000 sets the newly generated configuration-session as ACTIVE. Then at step 312 configurable electronic device 1000 receives the new configuration and SPG from the administrator. At step 313 configurable electronic device 1000 performs Process A. Then at step 314 configurable electronic device 1000 sets the configuration-session as INACTIVE. In this particular variant, step 314 is the subsequent step for both steps 105 and 107.

According to one or more embodiments of the present invention, configurable electronic device 1000 comprises a mechanism to continue using the new configuration even if the SPG is not satisfied. This mechanism is referred to herein as "forceful-override". For readability, the acronym "FO" is used herein to refer to forceful-override. The FO mechanism provides the administrator with an ability to continue using the new configuration while having the knowledge that the SPG was not satisfied. This knowledge may be helpful for decision-making for future configuration or troubleshooting operations. FO is used as a flag-bit which can be either in "ON" mode or "OFF" mode. When FO enabled or set to ON mode, indicates that configurable electronic device 1000 should use the new configuration even if the SPG is not satisfied. When FO is not enabled or set to OFF mode, indicates that configurable electronic device 1000 should not continue to use the new configuration. In embodiments that use stateless configuration-sessions, instruction related to FO is received with the CSIR. In embodiments that use stateless configuration-sessions, instruction related to FO is received with the CSIR. In embodiments that use stateful configuration-sessions, instruction related to FO is received from the administrator with the new configuration. This is done because applying the new configuration may render the management interface becoming unreachable from the administrator and in that case it will not be possible for configurable electronic device 1000 to receive the FO instruction from the administrator in an interactive manner.

Figure 4:
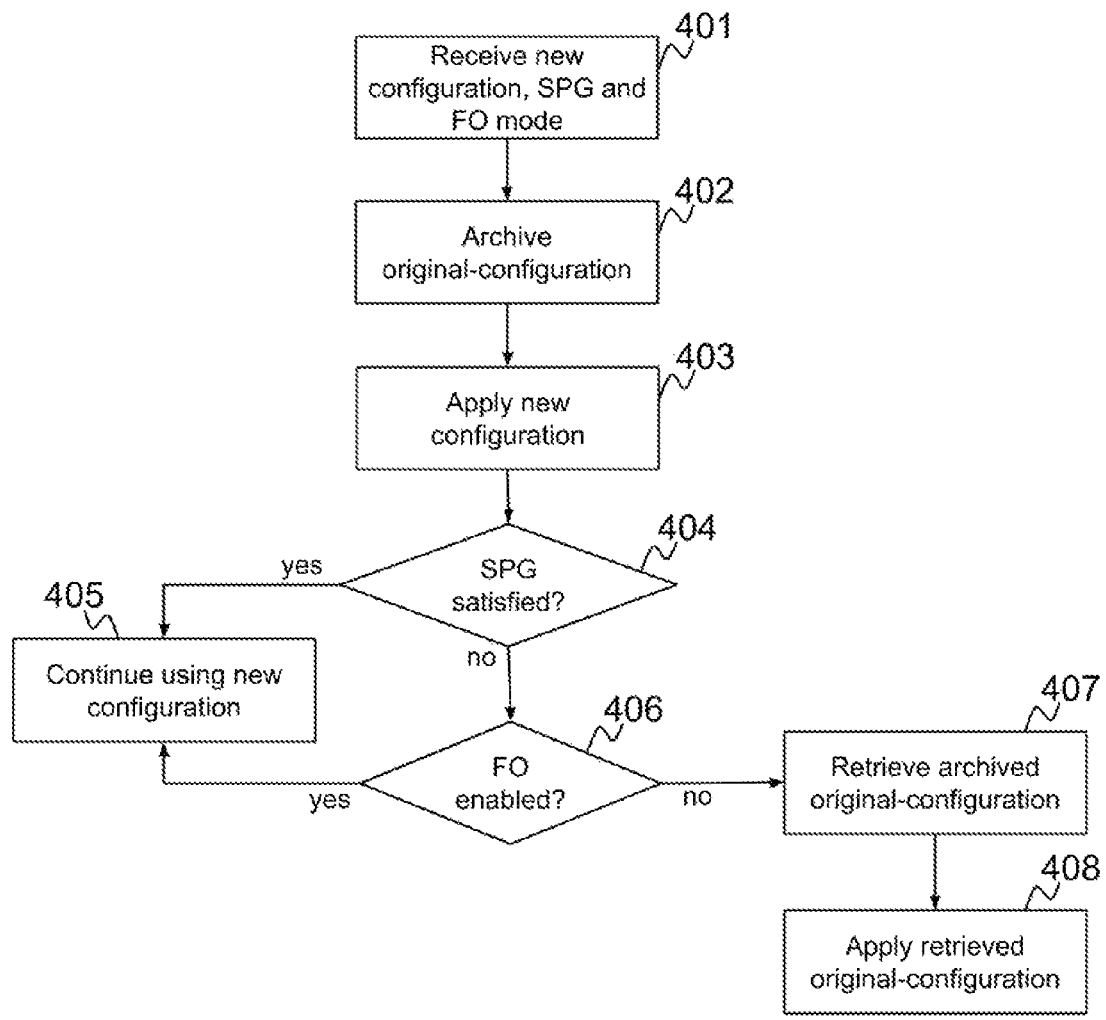
FIG. 4 is a flowchart illustrating example operation of a configurable electronic device performing a configuration rollback operation in accordance with one embodiment of the present invention.

FIG. 4 is a flowchart illustrating steps performed by configurable electronic device 1000 according to one embodiment of the present invention. In this embodiment, configurable electronic device 1000 performs the configuration operations without using configuration-sessions. Unlike the embodiment illustrated in FIG. 1, in this particular embodiment the administrator is given an option to use FO. At step 401 configurable electronic device 1000 receives the new configuration and SPG. At step 402 configurable electronic device 1000 archives its original-configuration in secondary storage 1004. At step 403 configurable electronic device 1000 applies the new configuration to its operational-configuration. At step 404 configurable electronic device 1000 determines if the SPG is satisfied with the new configuration. If the SPG is satisfied, then at step 405 configurable electronic device 1000 continues with using the operational-configuration created from the new configuration. If the SPG is not satisfied, then at step 406 configurable electronic device 1000 further determines if FO is enabled. If FO is enabled, then the operational-configuration from the new configuration will continue to be used. If FO is not enabled, then configurable electronic device 1000 retrieves the archived original-configuration from secondary storage 1004 at step 407. Then at step 408 configurable electronic device 1000 applies the retrieved configuration.

Figure 5:
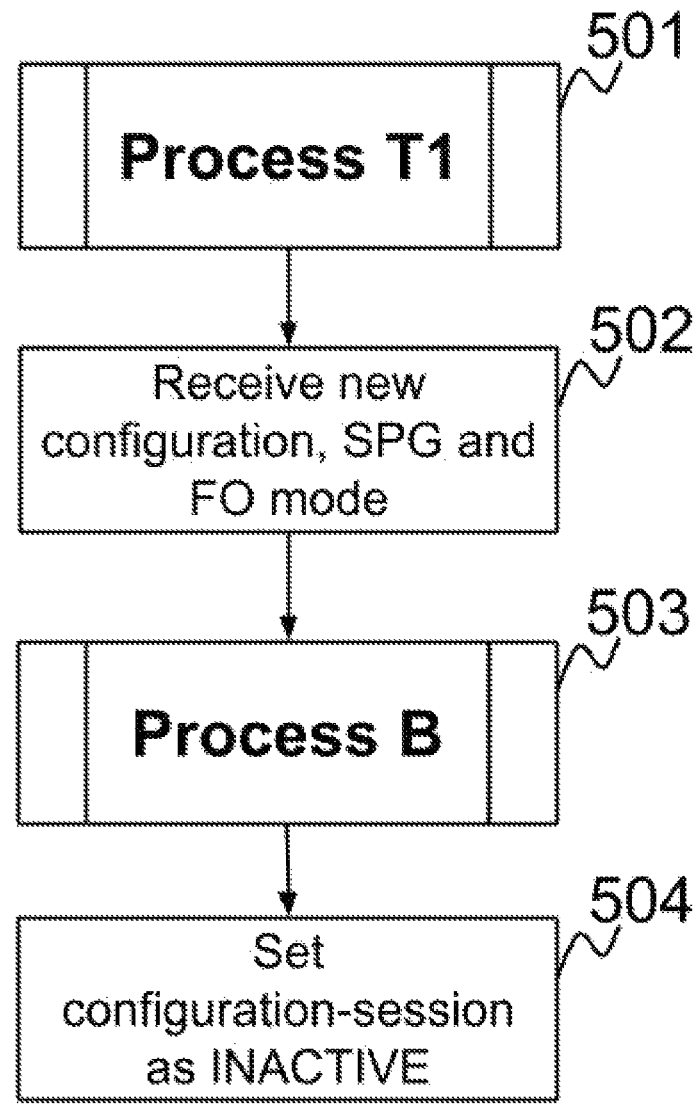
FIG. 5 is a flowchart illustrating example operation of a configurable electronic device performing a configuration rollback operation in accordance with one embodiment of the present invention.

FIG. 5 is a flowchart illustrating a variant of the embodiment illustrated by FIG. 4. In this particular variant, configurable electronic device 1000 comprises a mechanism to use stateful configuration-sessions to perform the configurational-operations. In this particular variant an administrator has the option to use FO. Furthermore, in this particular variant, CSL and CSLM are used in a similar method as illustrated in FIG. 2. In this variant, configurable electronic device 1000 receives the SPG and FO with the new configuration. FIG. 5 should be viewed in conjunction with FIG. 2 and FIG. 4 to better understand the variant. For illustration purpose, at step 501 configurable electronic device 1000 performs Process T1 which comprises steps 201 to 208 of FIG. 2. Then at step 502 configurable electronic device 1000 receives the new configuration, SPG and FO from the administrator. At step 503, configurable electronic device 1000 performs Process B which comprises steps 402 to 408 of FIG. 4. Then at step 504 configurable electronic device 1000 set the configuration-session as INACTIVE. Step 504 is a subsequent step for both steps 405 or 408.

Figure 6:
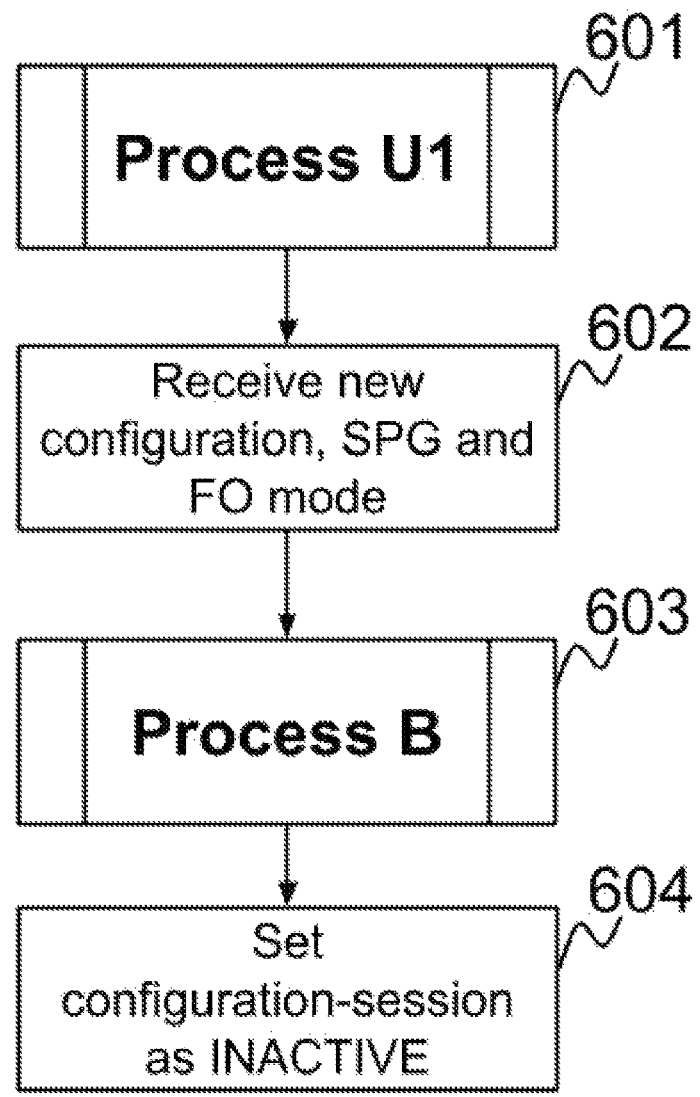
FIG. 6 is a flowchart illustrating example operation of a configurable electronic device performing a configuration rollback operation in accordance with one embodiment of the present invention.

FIG. 6 is a flowchart illustrating a variant of the embodiment illustrated by FIG. 4. In this particular variant, configurable electronic device 1000 comprises a mechanism to use stateful configuration-sessions to perform the configurational-operations. Similar to the embodiment illustrated by FIG. 4, this variant also comprises a mechanism to use FO. Furthermore, in this particular variant, CSL, CSLM and CSLO are used in a similar method as illustrated in FIG. 3. In this variant, configurable electronic device 1000 receives the SPG and FO with the new configuration. FIG. 6 should be viewed in conjunction with FIG. 3 and FIG. 4 to better understand the variant. At step 601 configurable electronic device 1000 performs Process U1 which comprises steps 301 to 311 of FIG. 3. Then at step 602 configurable electronic device 1000 receives the new configuration, SPG and FO from the administrator. At step 603, configurable electronic device 1000 performs Process B. Then at step 604 configurable electronic device 1000 set the configuration-session as INACTIVE. Step 604 is a subsequent step for both steps 405 or 408.

According to one embodiment that use retry-attempts, a configurable electronic device uses a maximum number of retry-attempts before determining that an SPG is not satisfied. This number is referred to herein as "maximum-retry-attempt". For readability the acronym "MRA" is used herein to refer to maximum-retry-attempt. The value of MRA can be '0' or more. The value of MRA can be determined by the manufacturer, the administrator, or be calculated by configurable electronic device 1000. If the value of MRA is not determined by the manufacturer or by the administrator, or is not calculated by the configurable electronic device 1000, then 0 will be used as the default value. A value of 0 for the MRA means that no retry will be performed. Additionally, in the embodiments that use MRA, a configurable electronic device comprises a mechanism to determine the number of retry-attempts that have already been performed. This number is referred to herein as "current-retry-attempt". For readability the acronym "CRA" is used herein to refer to current-retry-attempt. The value of CRA starts from −1 and is incremented by 1 after each operation of determining the state of the environmental-factors. If configurable electronic device 1000 determines that the value of CRA is not equal to the value of MRA, a configurable electronic device waits for a suitable amount of time before retrying again. This time period is referred to herein as "retry-interval". For readability the acronym "RI" is used herein to refer to retry-interval. RI is used by a configurable electronic device to wait a suitable amount of time for the problems with environmental-factors to be resolved. The duration of RI can be determined by a manufacturer of a configurable electronic device, or by an administrator, or calculated by a configurable electronic device itself based on the corresponding SPG or EFG. Situations where RI is determined by more than one entity, the value of RI determined by entity with the highest priority will be used, wherein this priority is predetermined by the manufacturer of a configurable electronic device. Value of RI is measured in seconds. In one embodiment, the administrator is given an option to set the value of 'RI' before applying a configuration. If the administrator does not set the value of 'RI', a configurable electronic device will use a default value. This default value is set by the manufacturer of a configurable electronic device or calculated by a configurable electronic device based on one or more parameters relevant to the environmental-factors. In one embodiment the administrator is not given the option to set the value of 'RI'. If a configurable electronic device determines that CRA is equal to MRA then it ends the process.

Figure 7:
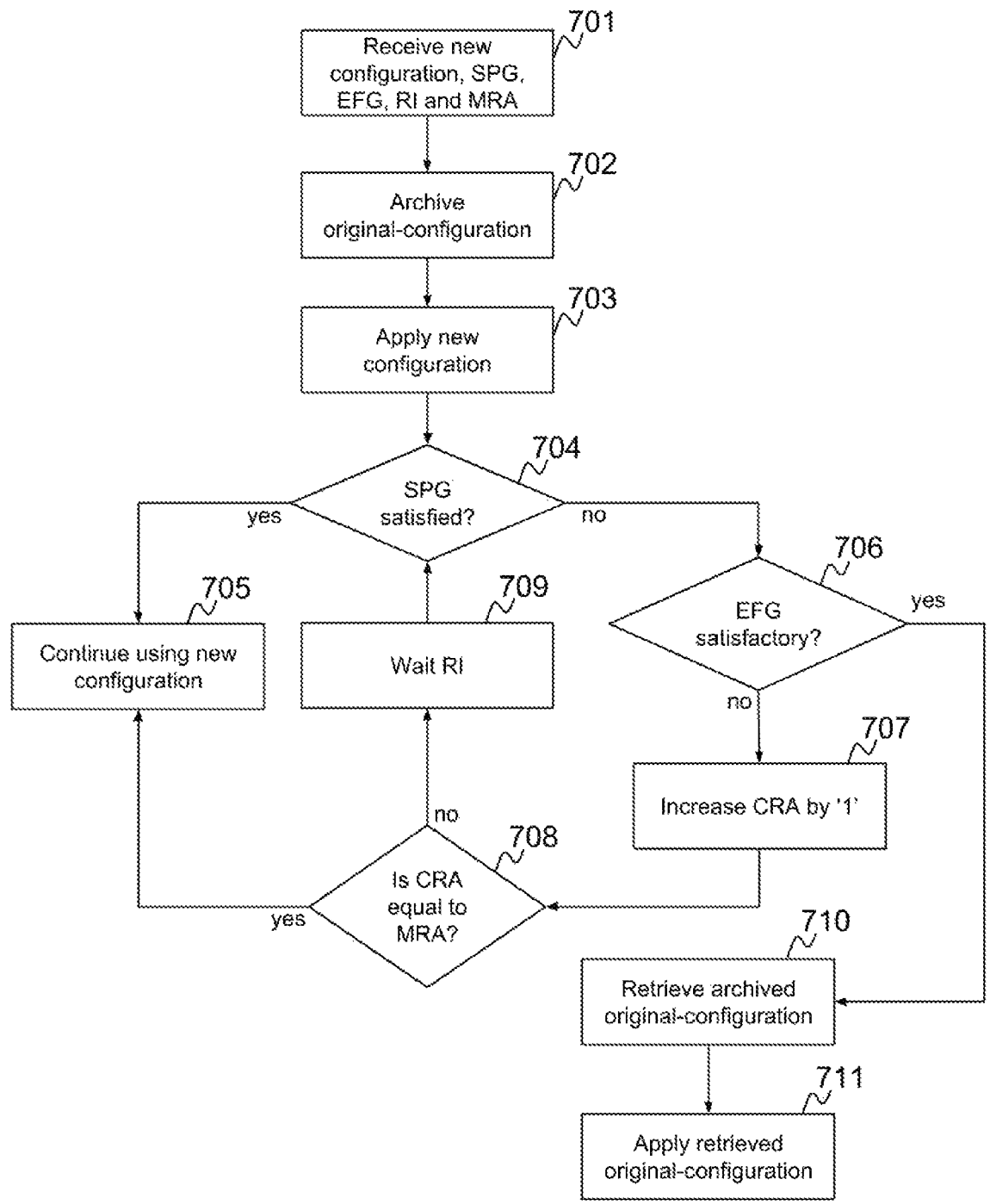
FIG. 7 is a flowchart illustrating example operation of a configurable electronic device performing a configuration rollback operation in accordance with one embodiment of the present invention.

FIG. 7 is a flowchart illustrating steps performed by configurable electronic device 1000 according to one embodiment of the present invention. In this embodiment, configurable electronic device 1000 performs the configuration operations without using configuration-sessions. Additionally, in this particular embodiment if the SPG is not satisfied using the new configuration, configurable electronic device 1000 comprises a mechanism to further determine whether the EFG is satisfactory. Furthermore, in this particular embodiment, configurable electronic device 1000 comprises a mechanism to retry, using RI, to determine if the SPG is satisfied with the new configuration. For each time retry is performed and the SPG is found not to be satisfied, configurable electronic device 1000 further determines whether the EFG is satisfactory. For illustration purpose, at step 701, configurable electronic device 1000 receives the new configuration with the SPG, EFG, RI and MRA. At step 702, configurable electronic device 1000 archives the original-configuration in secondary storage 1004. At step 703, configurable electronic device applies the new configuration. At step 704, configurable electronic device 1000 determines whether the SPG is satisfied using the new configuration. If the SPG is satisfied, then at step 705 configurable electronic device 1000 continues with using the new configuration. If SPG is not satisfied, then at step 706 configurable electronic device 1000 further determines if the EFG is satisfactory. According to this embodiment, if the SPG is not satisfied although the EFG is satisfactory, configurable electronic device 1000 concludes that the reason for SPG not being satisfied is wrong configuration, and therefore it performs a configuration rollback. If the EFG is satisfactory then at step 710 configurable electronic device 1000 retrieves the archived original-configuration. At step 711 configurable electronic device 1000 applies the retrieved original-configuration. If the EFG is not satisfactory, then at step 708 configurable electronic device 1000 increases the value of CRA by '−1'. Then at step 709 configurable electronic device 1000 determines if the value of CRA is equal to the value of MRA. If the values are not same then at step 709 configurable electronic device 1000 waits RI. Then configurable electronic device 1000 goes to step 704 to determine again if the SPG is satisfied. This process keeps continuing unless the EFG is found satisfactory at step 706, or until the value of CRA becomes equal to the value of MRA at step 708. If at step 708 the value of CRA is equal to the value of MRA, then configurable electronic device 1000 goes to step 705.

Figure 8:
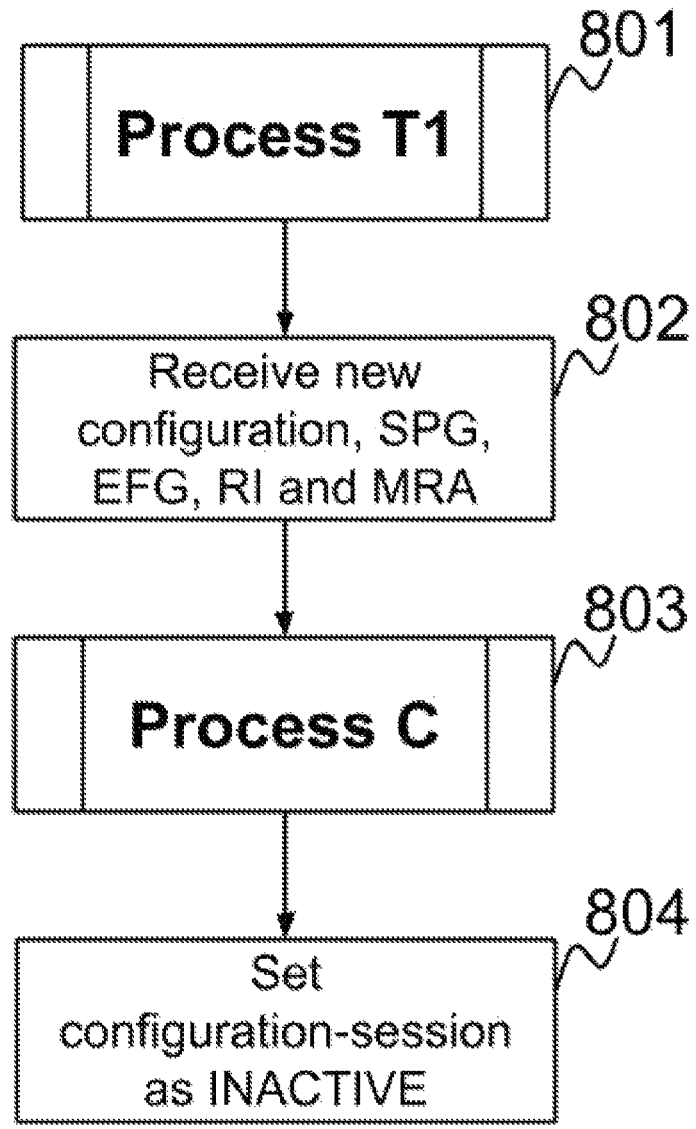
FIG. 8 is a flowchart illustrating example operation of a configurable electronic device performing a configuration rollback operation in accordance with one embodiment of the present invention.

FIG. 8 is a flowchart illustrating a variant of the embodiment illustrated by FIG. 7. In this particular variant, configurable electronic device 1000 comprises a mechanism to use stateful configuration-sessions to perform the configurational-operations. FIG. 8 should be viewed in conjunction with FIG. 2 and FIG. 7 to better understand the variant. This particular variant also comprises a mechanism to use the new configuration, SPG, EFG, RI and MRA in a similar method illustrated in FIG. 7. Furthermore, in this particular variant, CSL and CSLM are used in a similar method as illustrated in FIG. 2. For illustration purpose, at step 801 configurable electronic device 1000 performs Process T1. Then at step 802 configurable electronic device 1000 receives the new configuration, SPG, EFG, RI and MRA from the administrator. At step 803, configurable electronic device 1000 performs Process C which comprises steps 702 to 711 of FIG. 7. Then at step 804 configurable electronic device 1000 set the configuration-session as INACTIVE. Step 804 is a subsequent step for both steps 705 or 711.

Figure 9:
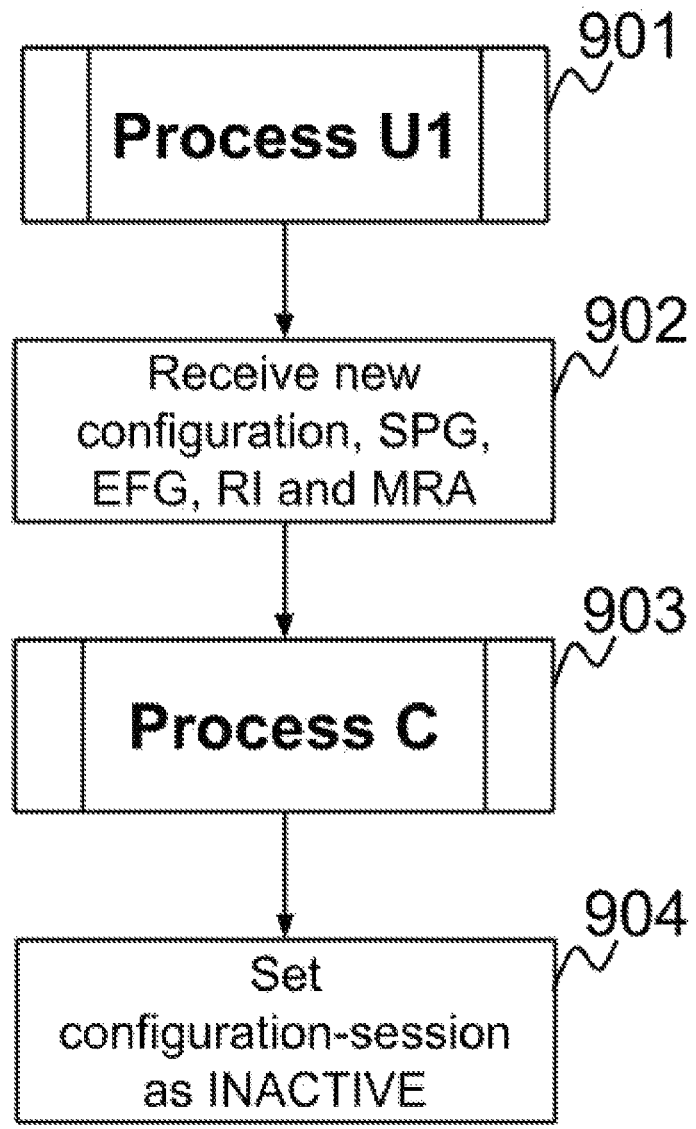
FIG. 9 is a flowchart illustrating example operation of a configurable electronic device performing a configuration rollback operation in accordance with one embodiment of the present invention.

FIG. 9 is a flowchart illustrating a variant of the embodiment illustrated by FIG. 7. In this particular variant, configurable electronic device 1000 comprises a mechanism to use stateful configuration-sessions to perform the configurational-operations. FIG. 9 should be viewed in conjunction with FIG. 3 and FIG. 7 to better understand the variant. This particular variant also comprises a mechanism to use the new configuration, SPG, EFG, RI and MRA in a similar method illustrated in FIG. 7. Furthermore, in this particular variant, CSL, CSLM and CSLO are used in a similar method as illustrated in FIG. 3. For illustration purpose, at step 901 configurable electronic device 1000 performs Process U1. Then at step 902 configurable electronic device 1000 receives the new configuration, SPG, EFG, RI and MRA from the administrator. At step 903, configurable electronic device 1000 performs Process C. Then at step 904 configurable electronic device 1000 set the configuration-session as INACTIVE. Step 904 is a subsequent step for both steps 705 or 711.

Figure 11:
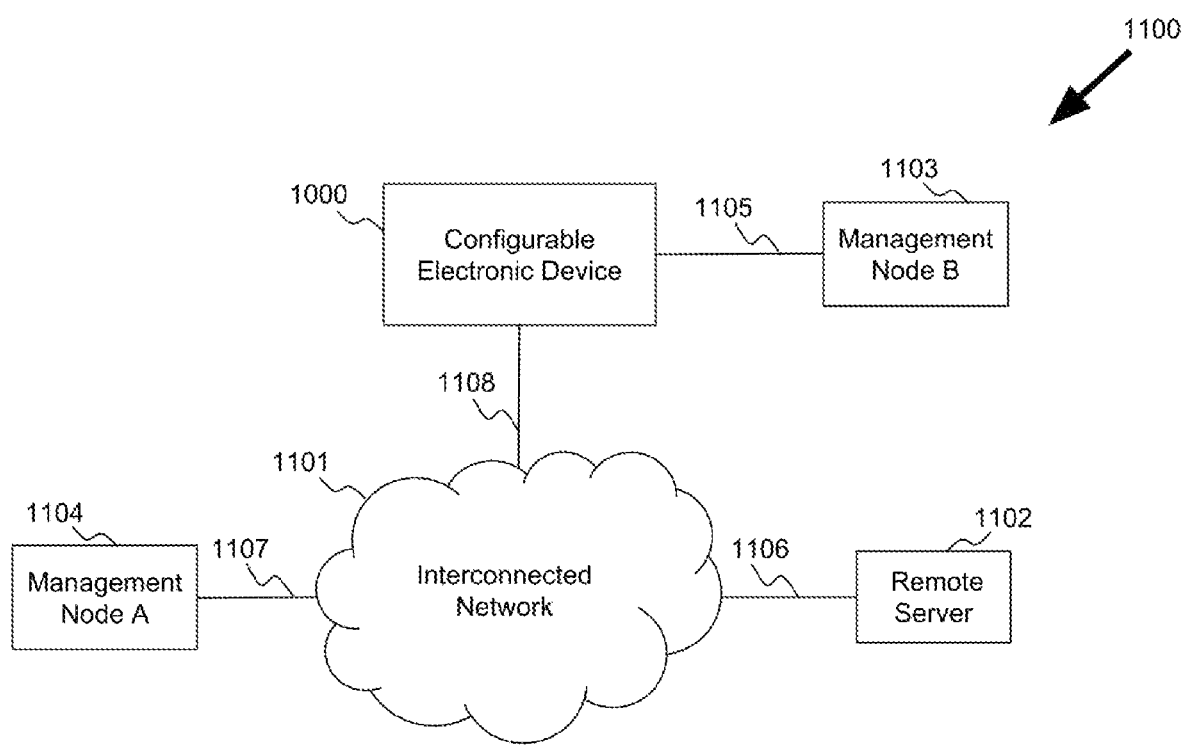
FIG. 11 illustrates a network diagram in which a configurable electronic device can perform configuration rollback operation in accordance with one embodiment of the present invention.

FIG. 11 illustrates a network topology 1100 according to one embodiment of the present invention. In this particular embodiment configurable electronic device 1000 is a networking equipment such as a network router. Management node B 1103 connects to device 1000 directly through a point-to-point Ethernet connection 1105. Management node A 1104 connects to device 1000 through interconnected network 1101 such as the Internet using link 1107. Remote server 1102 also connects to device 1000 through interconnected network 1101 using link 1106. Configurable Electronic Device 1000 connects to interconnected network 1101 using link 1108. There is no limitation on the connection type or topology device 1000 uses to connect to the management node A 1104, management node B 1103 or remote server 1102 as long as they make the devices reachable at the Internet Layer of TCP/IP protocol suit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

The invention claimed is:

1. A method for determining a configuration operable by a-network device, comprising:
 (a) receiving a second configuration;
 (b) receiving a predefined parameter and an environmental-factor-group;
 (c) archiving a first configuration in a non-transitory computer readable storage medium;
 (d) applying the second configuration as an operational-configuration of the network device;
 (e) determining whether the predefined parameter is satisfied with the second configuration;
 (f) when the predefined parameter is satisfied with the second configuration, maintaining to apply the second configuration as the operational-configuration of the network device; and
 (g) when the predefined parameter is not satisfied with the second configuration, determining whether the environmental-factor-group is satisfied or not;
  when the environmental-factor-group is satisfied:
   (i) retrieving the first configuration to be operable as the operational-configuration of the network device from the non-transitory computer readable storage medium; and
   (ii) applying the first configuration as the operational-configuration of the network device.

2. The method of claim 1, further comprising:
 before performing step (a):
  (A) receiving a configuration session initiation request for initiating a configuration session from a management interface;
  (B) determining whether a configuration session lock is locked or not;
  (C) when the configuration session lock is locked, rejecting the configuration session initiation request;
  (D) when the configuration session lock is not locked:
   (1) accepting the configuration session initiation request;
   (2) generating a new configuration session identifier for identifying the configuration session;
   (3) receiving a configuration session lock mode from the management interface;
   (4) setting the configuration session lock mode;
   (5) setting the configuration session to a first state;
 after performing step (f):
  setting the configuration session to a second state;
 wherein:
  the management interface includes a Command Line Interface (CLI), a Graphical User Interface (GUI), or a touchscreen; and
  the management interface comprises mechanisms to receive configuration instructions from an USSD, an MMI, or an SMS.

3. The method of claim 2, wherein the second configuration, the predefined parameter, and the environmental-factor-group are received from the management interface.

4. The method of claim 2, wherein:
 the first state is an active state; and
 the active state indicates that the configuration session is in operation.

5. The method of claim 2, wherein:
 the second state is an inactive state; and
 the inactive state indicates that the configuration session is not in operation.

6. The method of claim 2, wherein the new configuration session identifier is unique.

7. The method of claim 6, wherein the new configuration session identifier is a process identifier.

8. The method of claim 2, wherein:
 the configuration session lock mode comprises a first mode and a second mode;
 the first mode allows the network device to reject any new configuration session initiation requests without receiving instructions from the management interface; and
 the second mode allows the network device to reject any new configuration session initiation requests upon receiving instructions from the management interface.

9. The method of claim 1, further comprising:
when the environmental-factor-group is not satisfied:
(g) (iii) increasing a value of current-retry-attempt;
(g) (iv) determining if the value of current-retry-attempt is equal to a value of maximum-retry-attempt;
(g) (v) when the value of current-retry-attempt is equal to a value of maximum-retry-attempt, maintaining to apply the second configuration as the operational-configuration of the network device; and
(g) (vi) when the value of current-retry-attempt is less than the value of maximum-retry-attempt, waiting for a time period; and performing from step (e) again;
wherein:
the predefined parameter is substantially based on an expected outcome of the second configuration; and
the environmental-factor-group is based on at least one of: a hardware problem, a software problem, a firmware problem, absence of Quality of Service (QoS), and poor QoS.

10. The method of claim 9, wherein the expected outcome is reachability of a destination device from the network device.

11. A network device, comprising:
at least one network interface;
at least one main memory;
at least one non-transitory computer readable storage medium to store program instructions;
at least one processing unit executing the program instructions stored in the
at least one non-transitory computer readable storage medium for:
(a) receiving a predefined parameter and an environmental-factor-group;
(b) receiving a second configuration;
(c) archiving a first configuration in the at least one non-transitory computer readable storage medium;
(d) applying the second configuration as an operational-configuration of the network device;
(e) determining whether the predefined parameter is satisfied with the second configuration;
(f) when the predefined parameter is satisfied with the second configuration, maintaining to apply the second configuration as the operational-configuration of the network device;
(g) when the predefined parameter is not satisfied with the second configuration,
determining whether the environmental-factor-group is satisfied or not;
when the environmental-factor-group is satisfied:
(i) retrieving the first configuration to be operable as the operational-configuration of the network device from the at least one non-transitory computer readable storage medium; and
(ii) applying the first configuration as the operational-configuration of the network device.

12. The network device of claim 11, wherein the at least one non-transitory computer readable storage medium further stores program instructions executed by the at least one processing unit for:
before performing step (a):
(A) receiving a configuration session initiation request for initiating a configuration session from a management interface;
(B) determining whether a configuration session lock is locked or not;
(C) when the configuration session lock is locked, rejecting the configuration session initiation request;
(D) when the configuration session lock is not locked,
(1) accepting the configuration session initiation request;
(2) generating a new configuration session identifier for identifying the configuration session;
(3) receiving a configuration session lock mode from the management interface;
(4) setting the configuration session lock mode;
(5) setting the configuration session to a first state;
after performing step (f):
setting the configuration session to a second state;
wherein:
the management interface includes a Command Line Interface (CLI), a Graphical User Interface (GUI), or a touchscreen; and
the management interface comprises mechanisms to receive configuration instructions from an USSD, an MMI, or an SMS.

13. The network device of claim 12, wherein the second configuration, the predefined parameter, and the environmental-factor-group are received from the management interface.

14. The network device of claim 12, wherein:
the first state is an active state; and
the active state indicates that the configuration session is in operation.

15. The network device of claim 12, wherein:
the second state is an inactive state; and
the inactive state indicates that the configuration session is not in operation.

16. The network device of claim 12, wherein the new configuration session identifier is unique.

17. The network device of claim 16, wherein the new configuration session identifier is a process identifier.

18. The network device of claim 12, wherein:
the configuration session lock mode comprises a first mode and a second mode;
the first mode allows the network device to reject any new configuration session initiation requests without receiving instructions from the management interface; and
the second mode allows the network device to reject any new configuration session initiation requests upon receiving instructions from the management interface.

19. The network device of claim 11, wherein the at least one non-transitory computer readable storage medium further stores program instructions executed by the at least one processing unit for:
when the environmental-factor-group is not satisfied:
(g) (iii) increasing a value of current-retry-attempt;
(g) (iv) determining if the value of current-retry-attempt is equal to a value of maximum-retry-attempt;
(g) (v) when the value of current-retry-attempt is equal to a value of maximum-retry-attempt, maintaining to apply the second configuration as the operational-configuration of the network device; and
(g) (vi) when the value of current-retry-attempt is less than the value of maximum-retry-attempt, waiting for a time period; and performing from step (e) again;
wherein:
the predefined parameter is substantially based on an expected outcome of the second configuration; and the environmental-factor-group is based on at least one of: a hardware problem, a software problem, or a firmware problem, absence of Quality of Service (QoS), and poor QoS.

20. The network device of claim 19, wherein the expected outcome is reachability of a destination device from the network device.

\* \* \* \* \*